United States Patent [19]

Uchiyama et al.

[11] Patent Number: 5,089,842
[45] Date of Patent: Feb. 18, 1992

[54] FOCUS STATE DETECTING DEVICE

[75] Inventors: Shigeyuki Uchiyama, Tokyo; Yosuke Kusaka, Yokohama, both of Japan

[73] Assignee: Nikon Corporation, Tokyo, Japan

[21] Appl. No.: 627,926

[22] Filed: Dec. 17, 1990

Related U.S. Application Data

[63] Continuation of Ser. No. 476,553, Feb. 7, 1990, abandoned.

[30] Foreign Application Priority Data

Feb. 10, 1989 [JP]  Japan .................................. 1-32282
Jan. 18, 1990 [JP]  Japan .................................. 2-9098

[51] Int. Cl.$^5$ ............................................. G03B 13/36
[52] U.S. Cl. ..................................... 354/402; 354/408
[58] Field of Search .................................. 354/402, 408

[56] References Cited

U.S. PATENT DOCUMENTS

| | | | |
|---|---|---|---|
| 4,561,749 | 12/1985 | Utagawa | 354/406 |
| 4,716,434 | 12/1987 | Taniguchi et al. | 354/408 |
| 4,766,302 | 8/1988 | Ishida et al. | 354/408 |
| 4,816,861 | 3/1989 | Taniguchi et al. | 354/408 |

FOREIGN PATENT DOCUMENTS

| | | |
|---|---|---|
| 60-37513 | 2/1985 | Japan . |
| 60-262004 | 12/1985 | Japan . |
| 61-55618 | 3/1986 | Japan . |
| 61-245123 | 10/1986 | Japan . |
| 62-155608 | 7/1987 | Japan . |
| 62-163007 | 7/1987 | Japan . |

*Primary Examiner*—Russell E. Adams
*Attorney, Agent, or Firm*—Shapiro and Shapiro

[57] ABSTRACT

A focus state detecting device which utilizes image sensor arrays.

The focus detecting device comprises a light receiving device including a pair of arrays of photoelectric converting elements of charge accumulation type for respectively receiving light beams coming from different exit pupils of an objective lens, and generating an output signal in each of plural blocks formed in a distance measuring zone defined in the object field, a level discriminating device for discriminating the level of the output signal of each block from the light receiving device, and detecting a block or blocks in which the level of the output signal is outside a predetermined level range, a regulating device for regulating the signal level in such a manner that the output signal of the block or blocks detected by the level discriminating device is brought into the predetermined level range, a generating device for generating focus information for each block according to the output signal in the predetermined level range, and a selecting device for selecting optimum focus information from the focus information of the plural blocks.

12 Claims, 14 Drawing Sheets

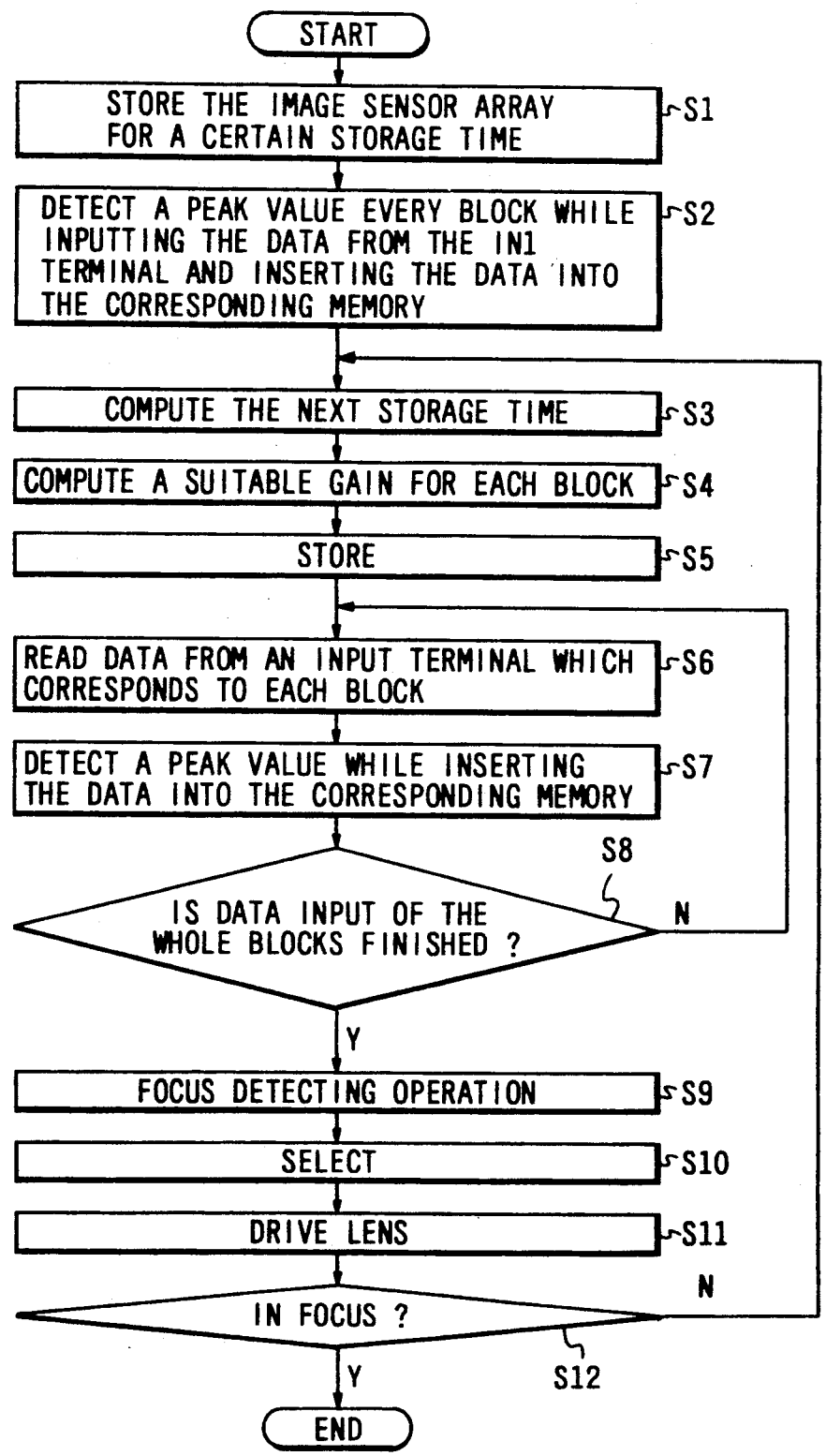

FOCUS STATE DETECTING DEVICE

This is a continuation of application Ser. No. 476,553 filed Feb. 7, 1990, now abandoned.

BACKGROUND OF THE INVENTION

1. Field of the Invention

The present invention relates to a focus state detecting device utilizing image sensor arrays, and more particularly to an automatic focus state detecting device for use in automatic focusing control of a camera.

2. Related Background Art

There is already known a focus state detecting device of this kind, in which an image of the object formed by an objective lens (image taking lens) is focused again by a re-imaging optical system as two images onto a pair of image sensor arrays, and the focus state is calculated from the outputs of said image sensor arrays to determine the positional aberration of said two images, thereby detecting the focus state of the objective lens.

However, in a camera equipped with such focus state detecting device, if plural objects of different distances are present in a distance measuring zone defined in the view finder frame, there are often encountered inconveniences that an intermediate distance of such objects is identified as the best focus position, or that the focus state detection becomes impossible.

For this reason there is already known a method of dividing the distance measuring zone into plural blocks, and focusing the objective lens based on the results of plural focus state detections conducted in said plural blocks.

For example, the Japanese Laid-open Patents Sho 60-262004, Sho 61-55618, Sho 62-163007 and Sho 62-155608 disclose a method of dividing the image of the object by dividing the paired image sensor arrays into plural blocks, effecting the focus state detection in each of said plural blocks, selecting a block containing the closest object or the object with a largest contrast based on the results of said plural focus state detections, and focusing the objective lens according to the result of focus state detection in thus selected block.

Said paired image sensor arrays are generally composed of CCD image sensors.

Now reference is made to FIG. 1 for explaining the function of a CCD image sensor.

FIG. 1A shows the structure of a CCD image sensor, which is composed of a photosensor array 10 consisting of plural photosensors for photoelectric conversion, a shift register 40 for charge transfer, and a shift gate 30 for transferring the charges generated and accumulated in the photosensors of the array 10 to the shift register 40.

The shift register 40, receiving a two-phase clock signal consisting of a clock signal CLK1 and a phase-inverted clock signal CLK2, is connected to an output terminal OUT through a voltage conversion unit 41 and a buffer 42.

The photosensor array 10 receives a clear pulse CLR for controlling the accumulating operation from a terminal CLR. The shift gate 30 positioned between the photosensor array 10 and the shift register 40 is connected to a terminal SH.

The function of such CCD image sensor will be explained in the following, with reference to FIG. 1B.

At a time T1, the terminal CLR is shifted from the H-level to the L-level, whereby the charges generated in the photosensor array 10 start to be accumulated in respective photosensors. At a time T2 after the lapse of a predetermined time, an L-level pulse is given to the terminal SH whereby the charges generated in the photosensors of the array 10 in a period from T1 to T2 are transferred in parallel manner to the shift register 40. The shift register 40 transfers said charges from left to right by the two-phase clock signals consisting of the clock signal CLK1 and the phase-inverted clock signal thereof. Said charges are converted into voltages by the voltage conversion unit 41, and are time-sequentially released through the buffer 42 and the terminal OUT.

The predetermined time from T1 to T2 is called the accumulation time, which is selected shorter or longer as the brightness of the object is higher or lower, in order to obtain a contrast enabling the focus state detecting operation, thereby obtaining an almost constant output regardless of the brightness of the object.

However such prior art has been associated with the following drawbacks in case plural objects of different brightnesses are present in the distance measuring zone.

FIG. 2A shows an example of the object field in the view finder, containing a distance measuring zone 50. The image of the object present in said zone 50 is projected onto the image sensor arrays, and said zone 50 is divided into three blocks 50a, 50b and 50c.

Now let us consider an example of an object A present in the block 50a and a more distant object B in the block 50b. It is assumed that the background is sky with highest brightness, and that the brightness becomes lower in the order of the object B and then the object A. When such objects A, B and the background sky are projected on the image sensors, the selection of the accumulating time is difficult to determine.

If the accumulation time is determined based on the brightness of the object B, the image sensor array will provide an output as shown in FIG. 2B, wherein the output of the block 50a is too small for the focus state detecting operation. While the block 50b provides an output suitable for the focus state detecting operation, the block 50c, only containing the sky, provides an output but the focus state detecting operation is impossible because of lack of contrast. In this case, therefore, the focus state detecting operation is possible only for the object B present in the block 50b, and the objective lens is so driven as to be focused to said object B.

Then, if the accumulation time is determined longer than in the case of FIG. 2B, based on the brightness of the object A, the image sensor array provides an output as shown in FIG. 2C, wherein the block 50a provides an output with a contrast suitable for the focus state detecting operation, but the blocks 50b and 50c provide saturated output without contrast because of the excessively high brightness in comparison with the accumulation time. Consequently the objective lens is so driven as to be focused to the object A present in the block 50a.

On the other hand, if the accumulation time is determined according to the brightness of the background sky, there is obtained an output as shown in FIG. 2D, wherein the focus state detecting operation is impossible in the block 50a because of the low output. Said operation is possible in the block 50b but is unstable because of the low output, and is impossible in the block 50c because of lack of contrast. Thus the objective lens is so driven as to be focused to the object B in the block 50b, but precise focusing cannot be achieved because the low output leads to an unstable result of focus state detection.

Thus, if plural objects with significant difference in brightness are present in the distance measuring zone, the object to be focused may be undesirably selected or the precision of focusing may be degraded, depending on the method of selecting the accumulation time for the image sensor arrays. For example, when it is desired to focus the lens to the closest object in the distance measuring zone, the focus state detecting operation for such object becomes impossible if an accumulation time suitable for another object is selected.

SUMMARY OF THE INVENTION

In consideration of the foregoing an object of the present invention is to provide a focus state detecting device capable o securely focusing the objective lens to a desired object, even in a case where plural objects of significant difference in brightness are present in the distance measuring zone.

The present invention is firstly applicable to a focus state detecting device in which the image of the object in the distance measuring zone is divided into two images by a re-imaging optical system including an objective lens, thus projecting respective light beams of said images emerging from different exit pupils of the objective lens onto a pair of image sensor arrays of charge accumulation type (linear CCD's), dividing said distance measuring zone into plural blocks and calculating the focusing information in each of said blocks based on the output signals of said image sensor arrays.

The present invention provides the following three methods in such focus state detecting device.

Accumulation time control method

There are provided level discriminating means for discriminating whether the output signals of each block of the image sensor arrays are in a signal level appropriate for the calculation of focusing information; accumulation time control means for selecting an accumulation time, for obtaining output signals of an appropriate level, for a block of which signal level is identified as inappropriate by said level discriminating means, thereby obtaining the output signals again from the image sensor arrays; and operation means for obtaining the focus detection information from the output signals identified as appropriate by said level discriminating means.

Gain control method

There are provided an amplifier with controllable gain for amplifying the output signals of said image sensor arrays, level discriminating means for discriminating whether the output signals of said amplifier are in a signal level appropriate for the calculation of focusing information; gain control means for calculating a gain for obtaining an appropriate level, for a block identified as inappropriate by said level discriminating means, thereby obtaining the output signals again from said image sensor arrays after said selected gain is set in said amplifier; and operation means for calculating the focusing information on the output signals identified as appropriate by said level discrimination means.

Filter coefficient control method

This method is based on the calculation of the focusing information from a new series of data obtained by a certain filtering process applied on the output signals of each block of the image sensor arrays.

In the present filter coefficient control method, there are provided level discriminating means for discriminating whether the output signals of each block of the image sensor arrays are in a signal level appropriate for the calculation of focusing information; filter control means for determining coefficients of said filtering process for obtaining an appropriate signal level, for a block identified as inappropriate by said level discriminating means, thereby effecting said filtering process again to obtain a new series of data; and operation means for calculating the focusing information on the output signals identified as appropriate by said level discriminating means.

In any method, if the focusing information arbitrarily selected from plural information obtained at first indicates an out-of-focus state requiring another focus state detection after the focusing operation, an accumulation time corresponding to the selected result is determined for the next accumulation cycle, and, in the next and ensuing cycles, the focus state detection is conducted only in a selected block, thereby dispensing with the control on the accumulation time, gain or filtering coefficients.

The present invention can be applied to the example shown in FIG. 2 in the following manner.

At first, in the accumulation time control method, the charge accumulation is conducted three times with accumulation times respectively suitable for the brightnesses of the object A, object B and background sky, so that the output suitable for focus state detection can be obtained for all the objects.

In the gain control method, the accumulation time is so selected as to obtain an output as shown in FIG. 2B, and the gain of the amplifier is selected higher in the transfer of the output for the object A, than in the transfer of the output for the object B or the background sky, whereby an output suitable for focus state detection is obtained for all the objects.

In the filtering coefficient control method, the accumulation time is initially so selected as to obtain an output as shown in FIG. 2B, and at least two output signals (a pair of output signals obtained by dividing the object image into two images by the re-imaging optical system) in each block of the CCD image sensor arrays are synthesized, by correlation calculation, to obtain a new series of data. The filtering coefficients used in this operation are selected higher for the output corresponding to the object A than for the object B or the background sky, thereby obtaining new data appropriate for focus state detection for all the objects.

Then, from the plural results obtained by focus state detections in any of these methods, a result satisfying certain conditions is selected, and the next accumulation time is determined by the output of a block which gave said selected result, whereby, in the next charge accumulation, the object present in the selected block provides an optimum output level for the focus state detection.

Therefore, the relationship of distances of the objects present in the distance measuring zone is clarified in the first charge accumulation, and, if the closest object, for example, is selected, the charge accumulation and the calculation in the second and ensuing cycles are conducted with preference to the thus selected closest object, so that the objective lens can be focused to said object with sufficient precision.

BRIEF DESCRIPTION OF THE DRAWINGS

FIG. 18 is a flow chart of the control sequence of the fifth embodiment.

DESCRIPTION OF THE PREFERRED EMBODIMENTS

Figures 1A, 1B:
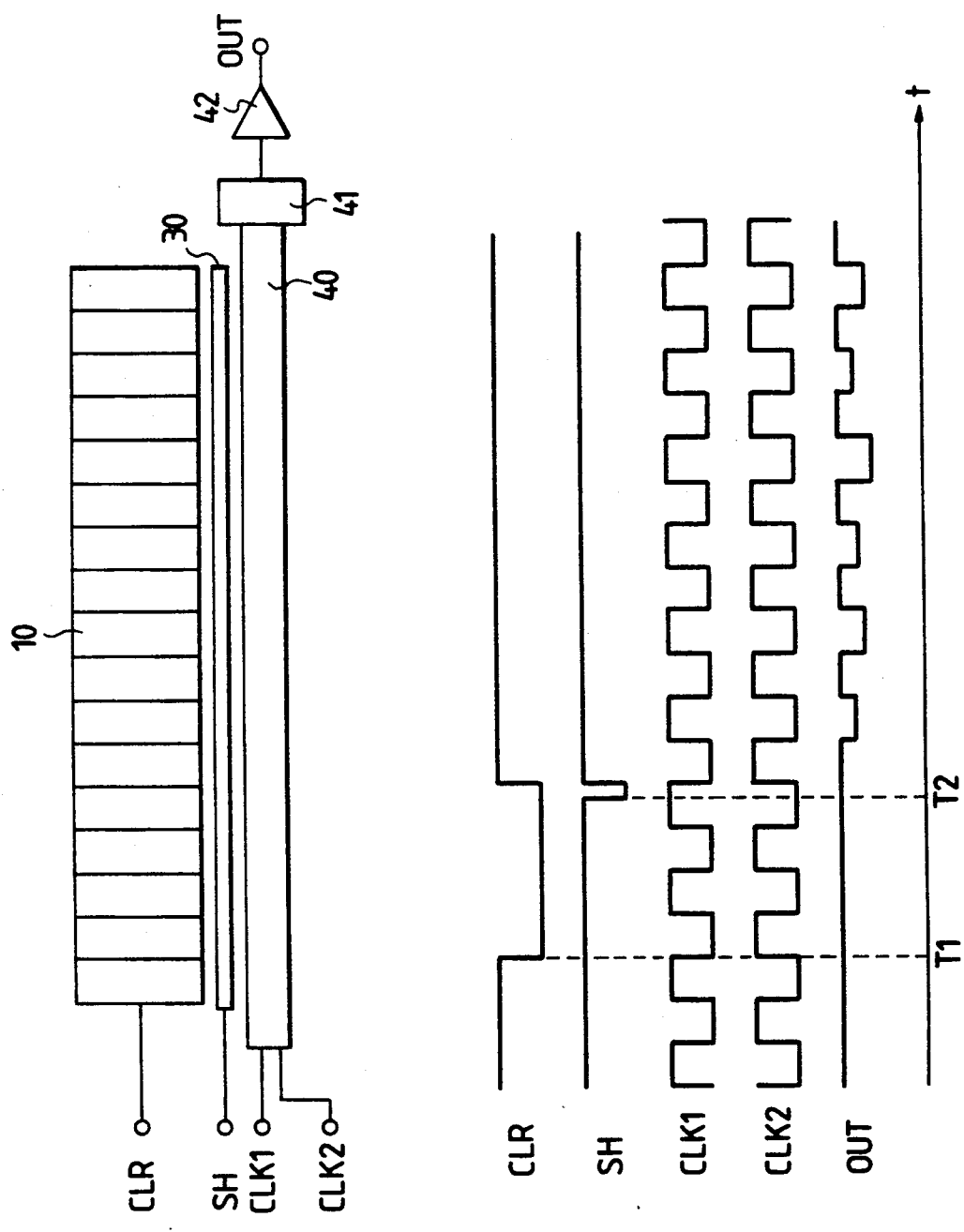
FIGS. 1A and 1B are schematic views of a conventional CCD image sensor.
Figure 2A:
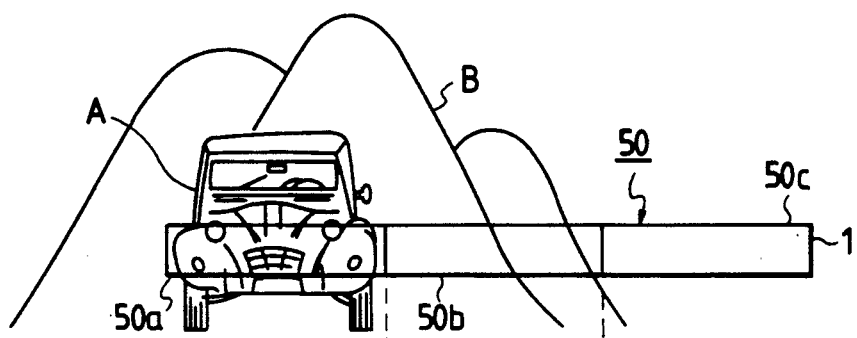
FIGS. 2A to 2D are views showing the change in the output signal when plural objects with significant difference in brightness are present in the distance measuring zone.
Figure 2B:
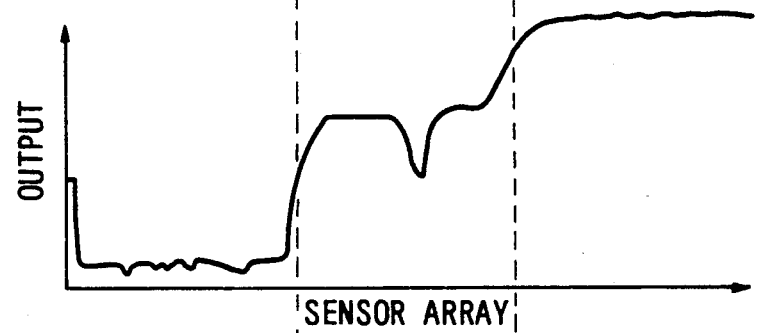
Figure 2C:
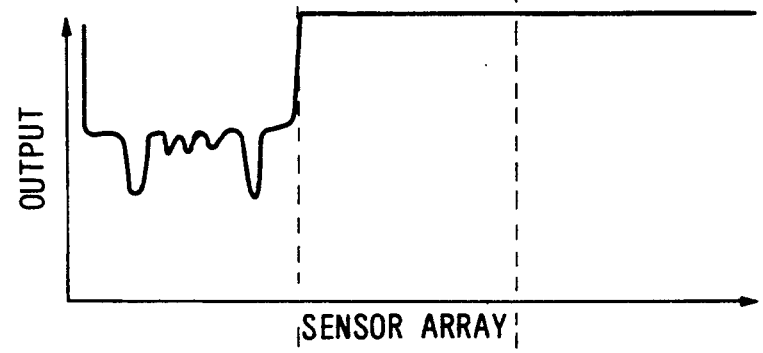
Figure 2D:
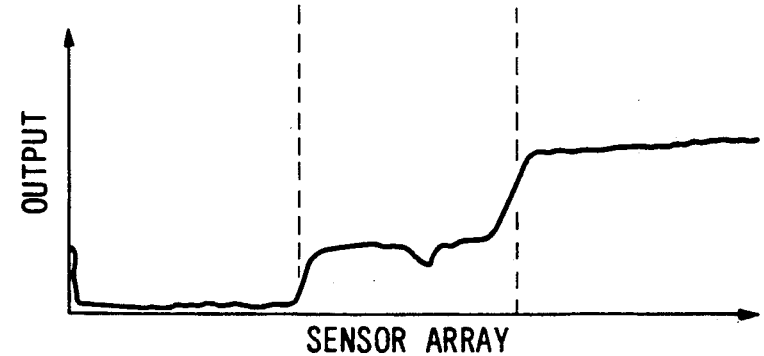
Figure 3:
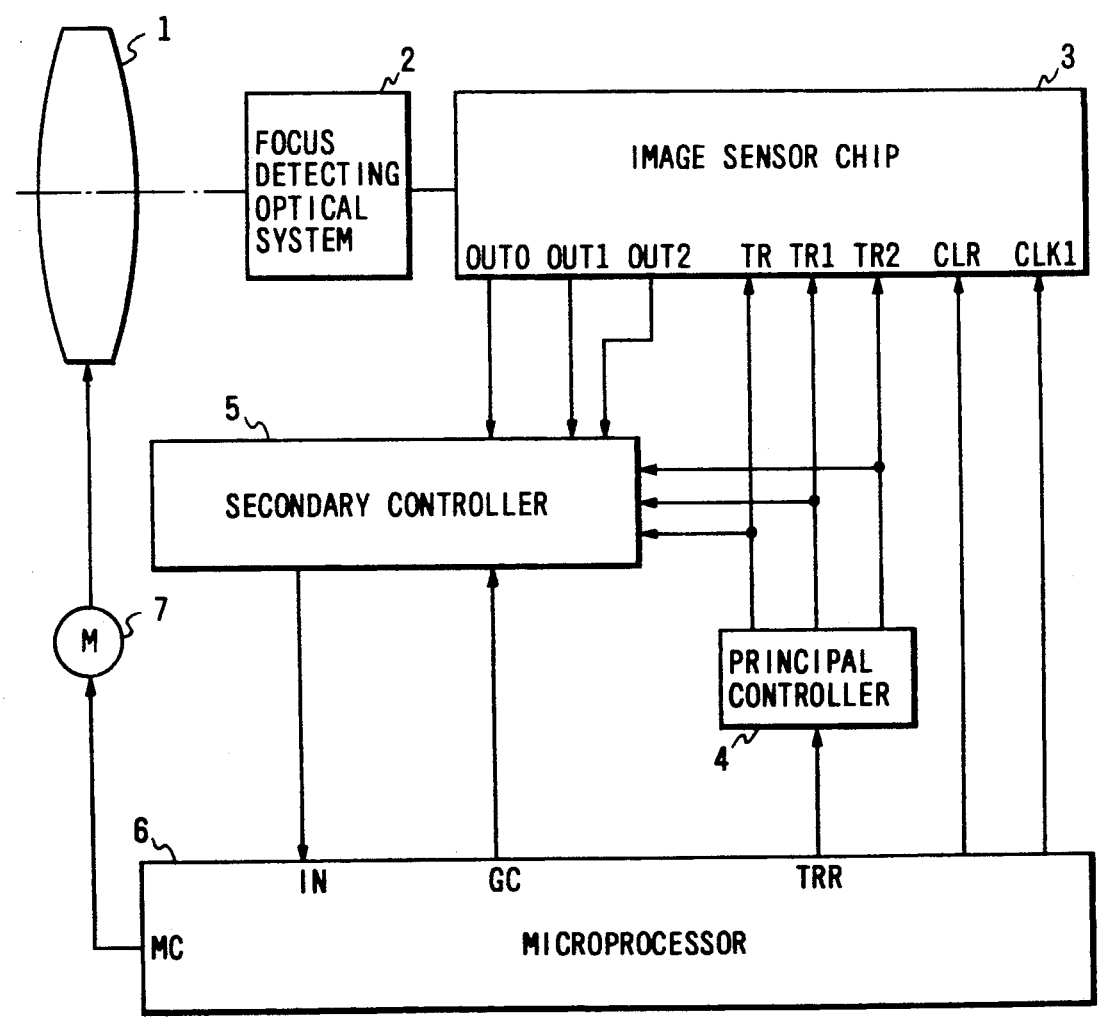
FIG. 3 is a block diagram of the device of the present invention.

FIG. 3 schematically shows the structure of the device of the present invention.

As shown in FIG. 3, the device of the present invention is provided with an image sensor chip 3 including image sensor arrays; a focus detection optical system 2 for projecting the light, transmitted by an objective (photographing) lens 1 onto the image sensor arrays; a motor 7 for driving the objective lens 1; a microprocessor 6 for effecting the focus state detecting operation and controlling the accumulation time of the image sensor arrays and the motor 7; and a first controller 4 and a second controller 5 for controlling the signals between the image sensor chip 3 and the microprocessor 6.

The image sensor chip 3 is provided with input ports TR, TR1, TR2, CLR and CLK1, and output ports OUT0, OUT1 and OUT2. The output ports OUT0, OUT1, OUT2 are connected to the second controller 5; the ports CLR, CLK1 to the microprocessor 6; and the input ports TR, TR2, TR1 to the first controller 4.

Signals released from the first controller 4 to the ports TR, TR1, TR2 are also supplied to the second controller 5. An output port TRR of the microprocessor 6 is connected to the first controller 4; an output port GC and an input port IN are both connected to the second controller 5, and an output port MC is connected to the motor 7.

In the following there will be explained, with reference to FIG. 4, the structure of the image sensor chip 3 shown in FIG. 3.

Figure 4:
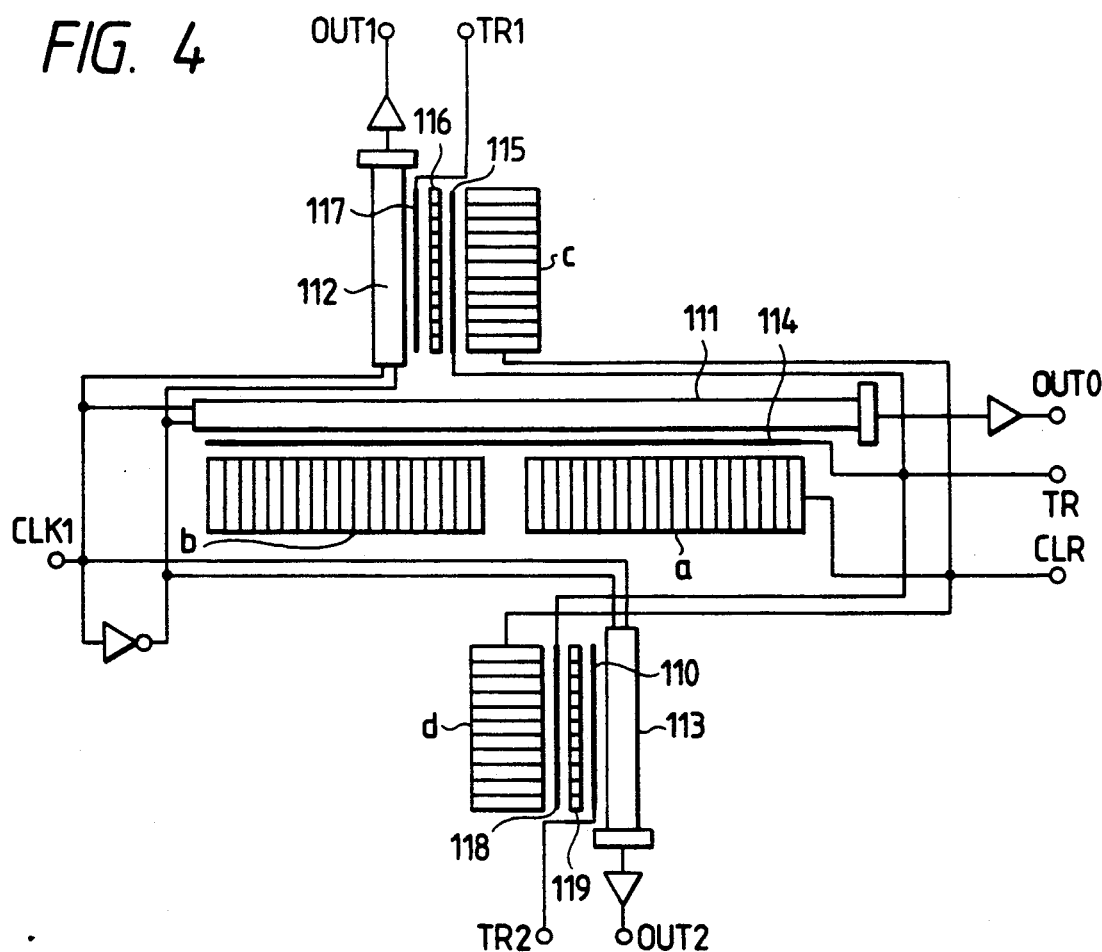
FIG. 4 is a schematic view of an image sensor chip employed in the present invention.

As shown in FIG. 4, the image sensor chip 3 is provided with a pair of image sensor arrays a, b positioned along the lateral direction, and other image sensor arrays, c, d perpendicular to the arrays a, b. The vertical image sensor c, d serve to effect focus state detection in the vertical direction, even for an object showing contrast only in the vertical direction, such as a horizontal line.

Parallel to the image sensor arrays a, b, c, d, there are provided first, second and third shift registers 111, 112, 133 for releasing the output signals of said image sensor arrays from output terminals OUT0, OUT1, OUT2. Between the image sensor arrays c, d and the shift registers 112, 113 there are provided memory units 116, 119 for temporarily storing the charge signals respectively corresponding to the photosensors of the image sensor arrays c, d and transferring said signals to the shift registers 112, 113 after a predetermined time.

There are provided a shift gate 114 for transferring the charge signals accumulated in the photosensors of the image sensor arrays a, b to the shift register 111; shift gates 115, 118 for transferring the charge signals accumulated in the photosensors of the image sensor arrays c, d to the memory units 116, 119; and transfer gates 117, 110 positioned between the memory units 116, 119 and the shift registers 112, 113 for transferring the charge signals accumulated in the memory elements of the memory units 116, 119 to said shift registers 112, 113.

The input terminal CLR is connected to all the image sensor arrays a, b, c, d and causes the photosensors to accumulate charges corresponding to the incident light, only during the period of L-level input signal. The input terminal CLK1 is connected to all the shift registers 111, 112, 113 for causing said registers to transfer the output charges from the image sensor arrays a, b, c, d in response to transfer pulses.

The first controller 4 releases digital trigger pulses to the ports TR, TR1, TR2 in response to signals entered from the port TRR of the microprocessor 6. The trigger pulse supplied to the port TR acts simultaneously on the shift gates 114, 115, 118, thus causing the transfer of the charge signals accumulated in the image sensor arrays a, b, c, d. The trigger pulses supplied to the ports TR1, TR2 act respectively on the transfer gates 117, 110 at different times, thereby causing the transfer of the charges stored in the memory units 116, 119.

In the following the function of the image sensor chip shown in FIG. 4 is explained, with reference to a timing chart shown in FIG. 5.

The image sensor arrays a, b, c, d simultaneously start charge accumulation at a time t1 when the digital signal to the input terminal CLR is shifted to the L-level. At a time t2, the first controller sends a pulse to the shift gate 114 through the port TR, whereby the charge signals of the image sensor arrays a, b are transferred to the shift register 111 and released from the output terminal OUT0 as a time-sequential signal PH in response to the transfer pulses. At the same time t2, the charge signals of the image sensor arrays c, d are transferred, respectively, to the memory units 116, 119 through the shift gates 115, 118.

Then the first controller 4 sends a pulse to the port TR1 at a time t3 when the charge transfer from the image sensor array a, b to the shift register 111 is completed, thereby transferring the charge signals of the image sensor array c stored in the memory unit 116 to the shift register 112 and releasing said signals from the output terminal OUT1 as a time-sequential signal PV1.

Also after the signal transfer from the image sensor array c, the first controller 4 sends a pulse, at a time t4, to the port TR2, thereby transferring the charge signals of the array d stored in the memory unit 119 to the shift register 113 and releasing said signals from the output terminal OUT2 as a time-sequential signal PV2.

The image sensor array chip 3 of the above-explained structure allows, therefore, to obtaining the charge signals released in parallel manner from the image sensor arrays a, b, c, d, in the form of time-sequential signals from the output terminals OUT0, OUT1, OUT2 without mutual overlapping.

Now reference is made to FIG. 6 for explaining the structure of the second controller 5 shown in FIG. 3.

The second controller 5 serves to apply gains determined by the microprocessor 6 on the output signals from the output terminals OUT0, OUT1, OUT2 of the image sensor array chip 3, and supply said three output signals in united manner to an input port IN of the microprocessor 6.

Figure 6A:
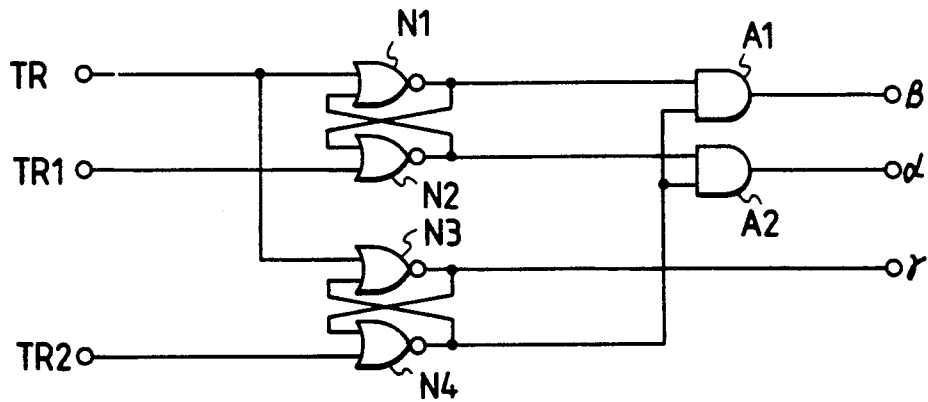
FIGS. 6A and 6B are circuit diagrams of a second controller shown in FIG. 3.
Figure 6B:
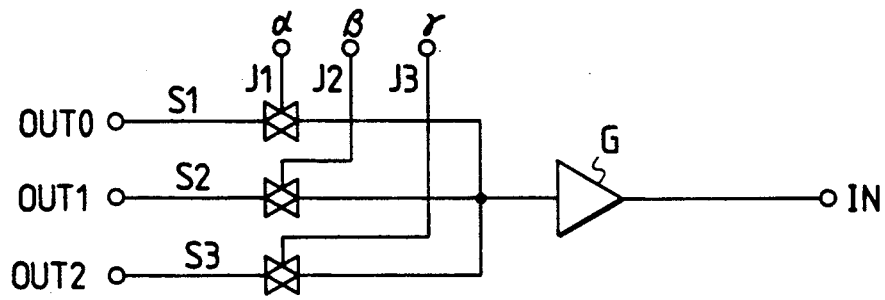

The output terminals OUT0, OUT1, OUT2 of the chip 3 are respectively connected to switches S1, S2 S3 shown in FIG. 6B, which are controlled by signals α, β, γ supplied to control terminals J1, J2, J3. The output terminals of said switches S1, S2, S3 are united and connected to a variable-gain amplifier G, of which gain is set by plural digital signals or an analog signal from a port GC of the microprocessor 6.

FIG. 6A shows a control circuit for producing the control signals to control terminals J1, J2, J3 of said switches, based on the signals supplied from the first controller 4 to the ports TR, TR1, TR2 of the image sensor array chip 3, and is composed of NOR gate N1, N2, N3, N4 and AND gates A1, A2.

In the following there will be explained the function of the second controller 5.

The pulse supplied from the first controller 4 to the port TR for terminating the charge accumulation in the image sensor arrays a, b, c, d is supplied also to the control circuit shown in FIG. 6A, whereby the control signal α to the control terminal J1 alone is shifted to the H-level. Thus the switch S1 alone is closed so that the signal of the image sensor arrays a, b from the terminal OUT0 alone is supplied, through the variable-gain amplifier G, to the port IN of the microprocessor 6.

Also the pulse supplied from the first controller 4 to the port TR1 upon completion of the signals of the image sensor arrays a, b is supplied also to the control circuit shown in FIG. 6A whereby the control signal β to the control terminal J2 alone is shifted to the H-level. Thus the switch S2 alone is turned on so that the signal of the image sensor array c from the terminal OUT1 alone is supplied, through the variable-gain amplifier G, to the port IN of the microprocessor 6.

Furthermore, the pulse supplied from the first controller 4 to the port TR2 upon completion of the signal transfer from the image sensor array c, is also supplied to the control circuit shown in FIG. 6A, whereby the control signal γ to the control terminal J3 alone is shifted to the H-level. Thus the switch S3 alone is turned on, and the signal of the image sensor array d is supplied, through the variable-gain amplifier G, to the port IN of the microprocessor 6. The gain setting of said amplifier G will be explained later.

Now reference is made to FIG. 7 for explaining the method of block division of the image sensor arrays shown in FIG. 4.

In FIG. 4, the image sensor arrays c, d positioned vertically in the photographing frame are not divided into blocks, as they contain fewer photo-sensors in comparison with those of the horizontal image sensor arrays a, b. Thus said image sensor arrays a, b alone are divided into blocks.

FIG. 7 illustrates one of the paired image sensor arrays a, b, and the method of block division is common for said arrays a and b.

Figure 7A:
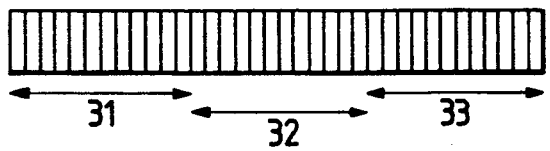
FIGS. 7A and 7B are schematic views showing the block division of the sensor array in the present invention.
Figure 7B:
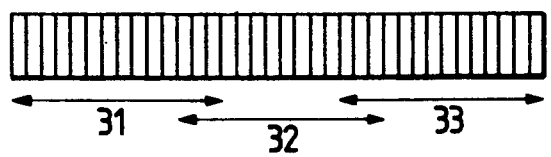

There ar generally two methods of block division, either as shown in FIG. 7A in which blocks 31, 32, 33 are not mutually overlapping, or as shown in FIG. 7B in which neighboring blocks 31 and 32, or 32 and 33, are mutually overlapping.

Thus the image sensor arrays a, b are respectively divided into three blocks 31a, 32a, 33a and 31b, 32b, 32c. The undivided image sensor arrays c, d are respectively called blocks 34c, 34d which constitute a block 34.

Consequently the calculation for focus state detection is conducted in the microprocessor 6, utilizing paired data of the blocks 31a, 31b; 32a, 32b; 33a, 33b; and 34c, 34d. The output signals of the image sensor arrays are sent to the microprocessor 6 in the order of a, b, c and d so that the microprocessor 6 receives the data of the blocks in the order of 31a, 32a, 33a, 31b, 32b, 33b, 34c and 34d.

Now there will be explained the function of the microprocessor 6 shown in FIG. 3.

Figure 5:
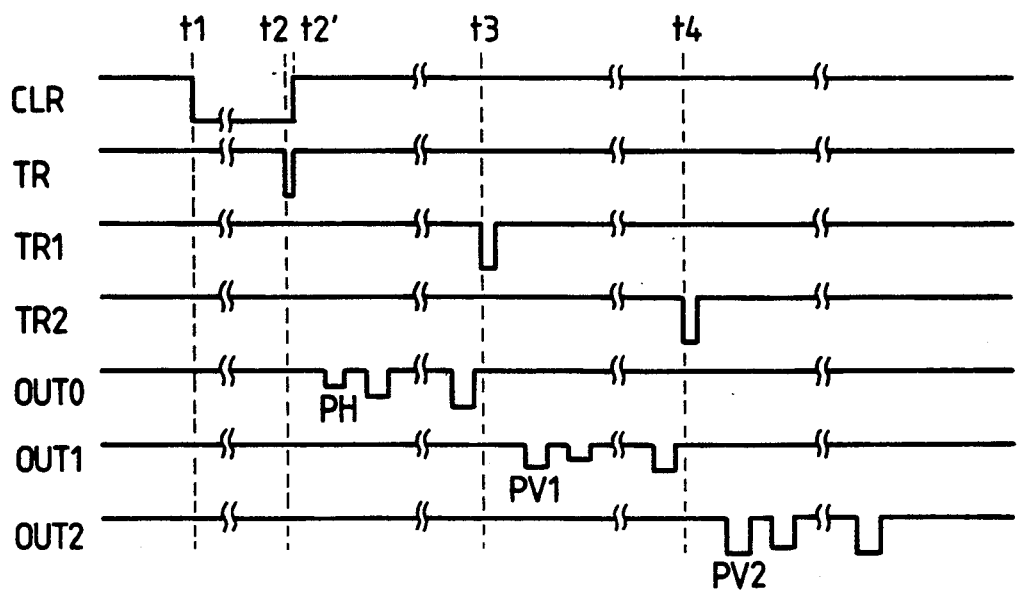
FIG. 5 is a timing chart showing the function of the image sensor array shown in FIG. 4.

The microprocessor 6 supplies the image sensor chip 3 with the signal for starting the charge accumulation as shown in FIGS. 4 and 5 through the terminal CLR, and the transfer gates 111, 112, 113 with the clock signal CLK1. It also supplies the first controller 4 with the signal for terminating the charge accumulation of the image sensor chip 3 through the port TRR, and sets the gain of the variable-gain amplifier of the second controller 5 as shown in FIG. 6.

Also the microprocessor 6 receives the data of the image sensor arrays from the second controller 5 through the port IN, converts said data into digital signals by an internal A/D converter, and stores thus converted data in an internal memory. Said A/D converter may be provided outside the microprocessor 6, but an internal converter is preferred for use in a camera with limited space therein. If a signal exceeding the upper limit of input to the A/D converter is entered, the data obtained after said A/D conversion become saturated, so that the image of the object projected on the image sensor arrays cannot be reproduced.

The microprocessor 6 executes the calculation for focus state detection, utilizing the paired data stored in the memory. The method of said calculation is already disclosed for example in the U.S. Pat. No. 4,561,749 of the present applicant, and will therefore be explained only briefly in the following.

The data:
a(1), ..., a(n) and
b(1), ..., b(n)

of a pair of image sensor arrays are used for determining the correlation coefficient C(L) with a mutual shift L of data, according to an equation:

$$C(L) = \sum_{i=k}^{r} |a(i) - b(j)| \quad (1)$$

wherein $j - i = L$, and $L = -Lm, \ldots, -2, -1, 0, 1, 2, \ldots, Lm$

L is an integer corresponding to the amount of shift of the group of data, and the initial term k and the final term r may be varied depending on the shift amount L. The in-focus point is indicated by a shift amount L providing the minimum correlation C(L).

Figure 8A:
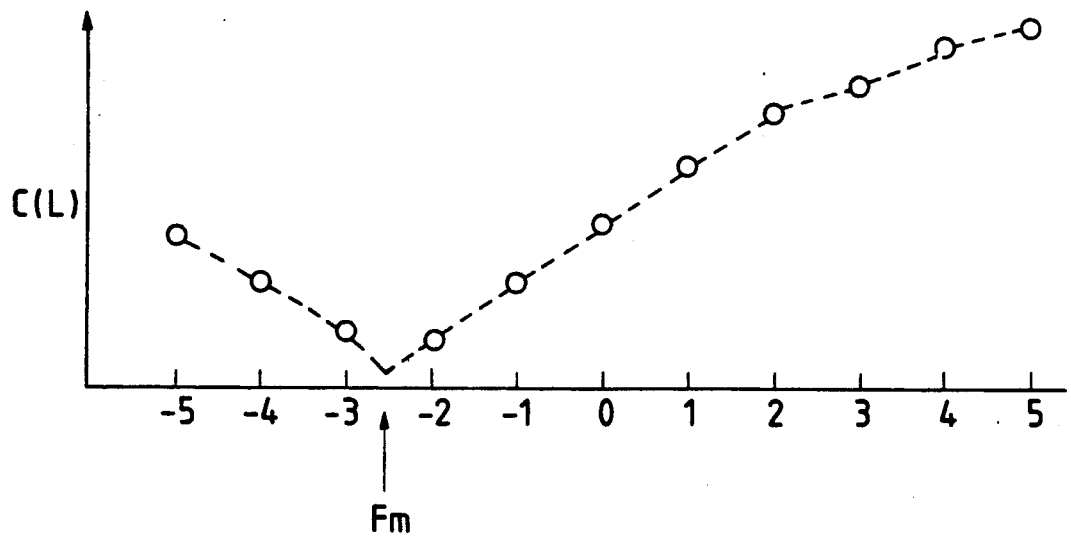
FIGS. 8A and 8B are charts showing the focus state detecting operation in the present invention.

However the correlation C(L) is given as scattered values as shown in FIG. 8A, and the detectable minimum value is limited by the pitch of the image sensor arrays. Therefore the present applicant disclosed, in the Japanese Laid-open Patent Sho 60-37513, a method of more detailed focus state detection by determining a new minimum value Cex through an interpolation based on the scattered values of correlation C(L).

Figure 8B:
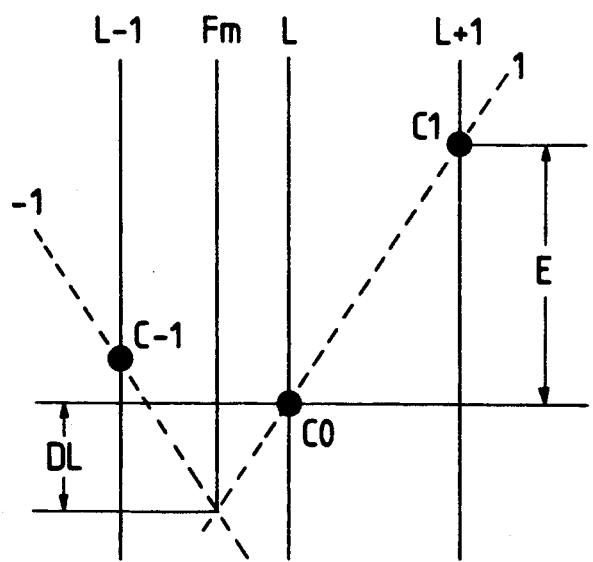

Said interpolation is conducted, as shown in FIG. 8B, from the minimum correlation $C_0$ and correlations $C_{-1}$, $C_1$ at the adjacent shifts on both sides, and the in-focus position Fm, or the shift amount providing the minimum Cex is given by the following equations:

$$DL = (C_{-1} - C_1)/2,$$

$$Cex = C_0 - |DL|,$$

$$E = MAX\{C_1 - C_0, C_{-1} - C_0\}$$

$$F_m = L + DL/E \quad (2)$$

wherein MAX{Ca, Cb} indicates selection of the larger of Ca and Cb.

It is necessary to discriminate whether thus obtained minimum Cex really indicates the in-focus position or it is caused by a fluctuation of correlation resulting for example from noise. The minimum value Cex is identified as reliable when the following condition is satisfied, and the calculation of the focus state detection is completed:

$$E > Est \text{ and } Cex/E < Cst$$

wherein Est and Cst are predetermined values.

In the foregoing explanation, the data of the image sensor arrays are directly utilized in the calculation, but the Japanese Laid-open Patent Sho 61-245123 discloses a method of preparing a pair of new data by applying a filtering process such as elimination of high- or low-frequency components to the data of the image sensor arrays and effecting the calculation of focus state detection with thus processed data.

The data after elimination of high-frequency components:

a'(1), ..., a'(m),
b'(1), ..., b'(m)

can be calculated from the original data:

a(1), ..., a(n),
b(1), ..., b(n)

according to the following equations:

$$a'(i) = \{a(2i-1) + 3 \times a(2i) + 4 \times a(2i+1) + 3 \times a(2i+2) + a(2i+3)\}/12$$

$$b'(i) = \{b(2i-1) + 3 \times b(2i) + 4 \times b(2i+1) + 3 \times b(2i+2) + b(2i+3)\}/12 \quad (3)$$

Also the data after elimination of low-frequency components:

a''(1), ..., b''(q),
b''(1), ..., b''(q)

can be obtained according to the following equations:

$$a''(i) = -a(i) + 2 \times a(i+h) - a(i+2h) + \text{offset},$$

$$b''(i) = -b(i) + 2 \times b(i+h) - b(i+2h) + \text{offset}, \quad (4)$$

wherein h and offset are predetermined natural numbers.

In the equations (4), the "offset" is added in order that a''(i) and b''(i) do not become negative. Said elimination of the low-frequency components may be applied to the output data a(i), b(i) of the image sensor arrays as shown in (4), or to the data a'(i), b'(i) after the elimination of the high-frequency components. The use of such filtered data in the calculation of focus state detection provides an improved precision, in comparison with the calculation with the unprocessed data of the image sensor arrays.

The above-explained calculation for focus state detection provides four results at maximum, then a result indicating the shortest distance, for example, is selected from these results, and the motor 7 is driven according to the thus selected result, thereby moving the objective lens 1 to the in-focus position.

In the following there will be explained embodiments of the present invention, based on the focus detecting device of the above-explained structure.

A first embodiment of the present invention effects the charge accumulation of the image sensor arrays with an accumulation time appropriate for a block containing the object of highest brightness in the distance measuring zone, and effects the charge accumulation again for a block in which an appropriate output could not be obtained in the first-mentioned charge accumulation, with an accumulation time appropriate for such block, thereby obtaining data appropriate for the calculation of focus state detection.

Figure 9:
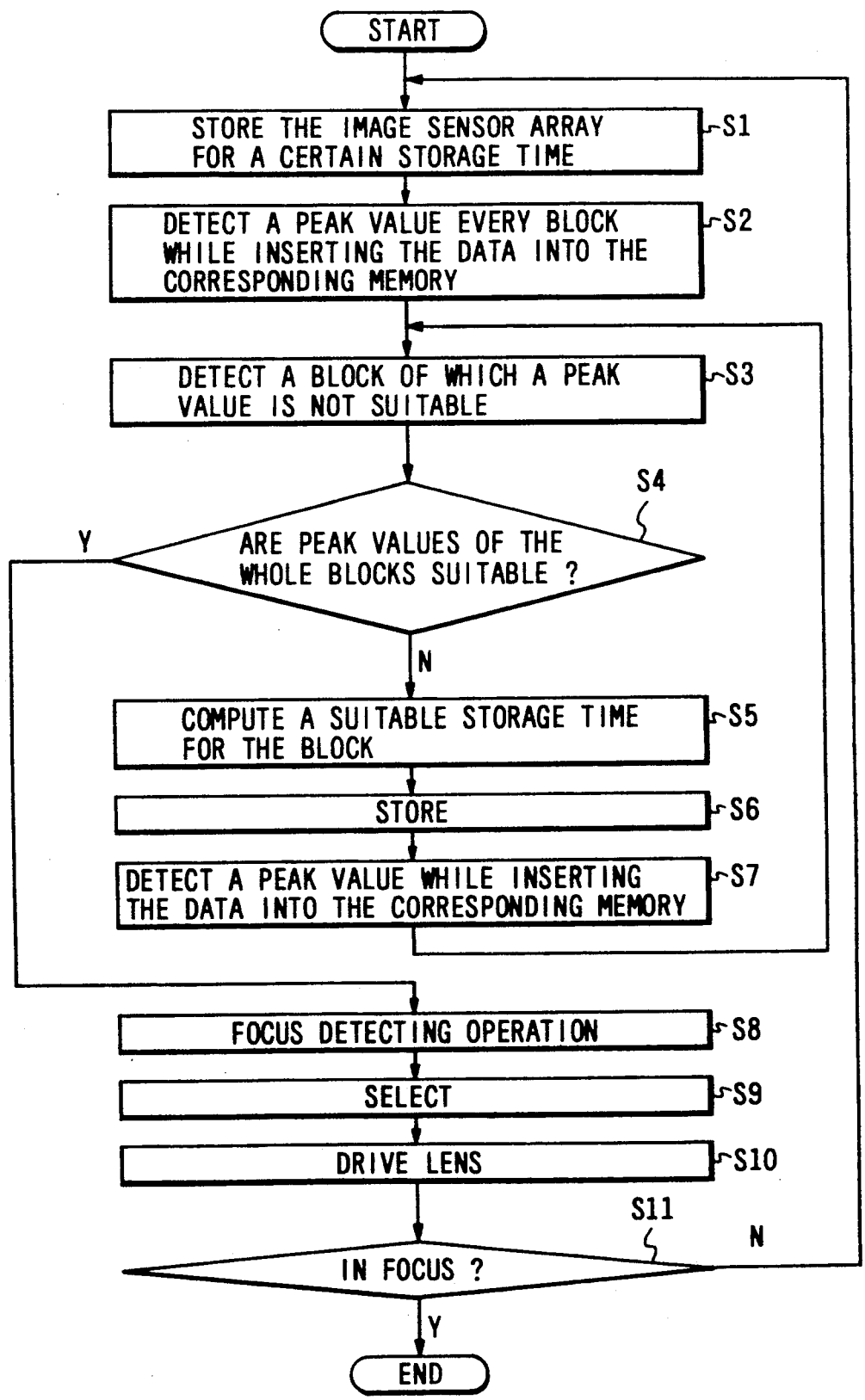
FIG. 9 is a flow chart of the control sequence in a first embodiment of the present invention.

The function of said first embodiment is executed by the microprocessor 6, according to a flow chart shown in FIG. 9.

The sequence shown in FIG. 9 is started by the turning-on of power supply, for example by a half push of a shutter releasing button of the camera. At first a step 1 executes the charge accumulation of the image sensor arrays in order to evaluate the contrast of the image of the object projected on said arrays. The accumulation time for this purpose can be so selected as not to cause saturation in the A/D converter and as not to obtain an excessively low output, and can be determined, for example, according to the output of a monitoring photosensor (not shown).

Upon completion of the charge accumulation in the step 1, a step 2 fetches the signal charges from the image sensor arrays and stores the obtained data in the memory areas corresponding to the blocks, with detection of the following peak value in each block:

peak value P1 of the blocks 31a, 31b;
peak value P2 of the blocks 32a, 32b;
peak value P3 of the blocks 33a, 33b; and peak value P4 of the blocks 34c, 34d.

Then a step 3 detects the peak value or values of an inappropriate level for the calculation of focus state detection to be executed in a step 8, among the peak values detected in the step 2. Said inappropriate level means, for example, outside a range of about ±15% of the predetermined value Ps in the step 1.

Then a step 4 discriminates the presence of an inappropriate peak value, and, if such peak value is present, a step 5 calculates the accumulation time for obtaining a predetermined peak value Ps from a block of which the previous peak value was identified as inappropriate.

The accumulation times T31, T32, T33, T34 respectively appropriate for the blocks 31, 32, 33, 34 are determined as follows:

$$T31 = Tr1 \times Ps/P1,$$
$$T32 = Tr2 \times Ps/P2,$$
$$T33 = Tr3 \times Ps/P3;$$
$$T34 = Tr4 \times Ps/P4 \qquad (5)$$

wherein Tr1, Tr2, Tr3, Tr4 are accumulation times of the blocks in the preceding cycle. Thus:

$$Tr1 = Tr2 = Tr3 = Tr4 = T0$$

in which T0 is the accumulation time in the step 1.

After the calculation of the accumulation time in the step 5, a step 6 sets the accumulation time again and effects the charge accumulation of the image sensor arrays. Subsequently a step 7 stores the data from the image sensor arrays in respective memory areas, with the detection of peak value for each block, as in the step 2. In the step 7 the data of all the blocks 31, 32, 33, 34 are transferred from the image sensor arrays to the microprocessor 6 through the second controller 5, but, if the charge accumulation is conducted with a time appropriate, for example, to the block 32 of which a peak value was identified as inappropriate in the preceding cycle, the data of the blocks 31, 33 and 34 are discarded without storage in the memory, and the data of the blocks 32a, 32b alone are stored in the corresponding memory. The time required for this operation can be shortened by transferring the data to be discarded with an increased frequency of the clock signal CLK1, and transferring the data of the necessary block with the normal frequency of the clock signal.

If appropriate data are obtained in the step 7 by resetting of the accumulation time for the block of which data were identified as inappropriate in the preceding cycle, the sequence returns to the step 3 for detecting the block with inappropriate peak value. If such block is still present, the steps 4 to 7 are executed to repeat the calculation and setting of the accumulation time, charge accumulation and data input. When the peak values of all the blocks are in the appropriate level, the sequence proceeds to a step 8 for effecting the focus state detection with four sets of paired data stored in the memory and identified as of the appropriate level.

The calculation of said step 8 for focus state detection provides four results at maximum. Then a step 9 selects a result indicating for example the shortest distance, and a step 10 drives the objective lens 1 to the in-focus position by the motor 7, according to the thus selected result. If a next step 11 identifies the in-focus state, the focus detecting operation is terminated. On the other hand, if an out-of-focus state is identified, the sequence returns to the step 1 to repeat the operations of charge accumulation, data storage and focus state detection as explained above.

The discrimination of the step 11 of the focus state of the objective lens 1 is conducted in such a manner, for example, that an in-focus state is identified when the amount of drive of the motor 7 in the step 10 does not exceed a predetermined value.

The second accumulation time T when the sequence returns from the step 11 to the step 2 is calculated as follows:

$$T = Tr \times Ps/Pm \qquad (6)$$

wherein Tr is the accumulation time in the step 1 of the preceding cycle. Pm is selected as the peak value of the block selected in the step 9, in order to effect the focus state detection with preference to the object in said selected block in the second and ensuing cycles, as the object to be focused is in said selected block, according to the result of calculation based on the preceding accumulation cycle.

In the second and ensuing cycles in which the block requiring focus state detection is already specified, it is not necessary to obtain the output signals appropriate for the focus state detection in all the blocks. It is therefore possible, after the data storage in the memory in the step 2, to skip the steps 3 and 4 and to immediately execute the step 8 for focus state detection.

Also as Pm in the equation (6), there may be employed the largest peak value among P1, P2, P3, P4 detected in the step 2.

The gain of the variable-gain amplifier of the second controller 5 in the first embodiment can be constant in the course of ordinary accumulation and data reading, and is controlled only in a special case under severe photographing conditions. More specifically said gain is controlled higher or lower for example when the entire object field is respectively very dark or very bright.

In the following there will be explained a second embodiment of the present invention.

Said second embodiment varies the gain of the variable-gain amplifier of the second controller 5 in the course of transfer of the data of the image sensor arrays, higher during the data transfer for a block including a object of a relatively low brightness in the distance measuring zone, and lower during the data transfer for a block including an object of a relatively high brightness, thereby obtaining the output appropriate for focus state detection in all the blocks.

Now the function of said second embodiment will be explained in the following with reference to FIG. 10.

At first a step 1 sends a predetermined signal from the port GC to the second controller 5, thereby setting the gain of the variable-gain amplifier at a basic initial value G0, which is selected as the lowest possible gain for said amplifier, since a higher gain reduces the S/N ratio of the output signals of the image sensor arrays.

Then a step 2 executes the charge accumulation of the image sensor arrays, and a step 3 stores the data in memories corresponding to the blocks, with detection of the peak value in each block. The charge accumulation in said step 2 is to evaluate the contrast of the image of the object projected on the image sensor arrays, so that the accumulation time can be so selected as not to cause saturation in the A/D converter and not to obtain an excessively low output, and can be determined, for example, according to the output of a monitoring photosensor (not shown).

Then a step 4 calculates the accumulation time T in the next cycle according to the following equation:

$$T = Tr \times Ps/Pm \quad (7)$$

wherein Pm is the largest of the peak values P1, P2, P3, P4 detected in the step 2, and Tr is the accumulation time in the preceding cycle.

The charge accumulation of the image sensor arrays with the thus calculated accumulation time provides a largest value, approximately equal to Ps, among all the outputs of the image sensor arrays.

Then a step 5 calculates a gain appropriate for the output of each block. Said gain is claculated, on the peak value of each block, the accumulation time Tr in the preceding cycle, the gain in the preceding cycle and the accumulation time of the next cycle calculated in the step 4, in such a manner that a peak value is equal to the predetermined value Ps in each block. More specifically, the appropriate gains G1, G2, G3, G4 of the blcoks 31, 32, 33, 34 can be calculated from the gains Gr1, Gr2, Gr3, Gr4 in the preceding cycle according to the following equations:

$$G1 = Gr1 \times Ps/P1 \times Tr/T$$

$$G2 = Gr2 \times Ps/P2 \times Tr/T$$

$$G3 = Gr3 \times Ps/P3 \times Tr/T$$

$$G4 = Gr4 \times Ps/P4 \times Tr/T \quad (8)$$

In the first process, the gain of the preceding cycle is G0 selected in the step 1, so that the step 4 provides:

$$Gr1 = Gr2 = Gr3 = Gr4 = G0$$

Then the sequence proceeds to a step 6 to execute the charge accumulation of the image sensor arrays with the accumulation time calculated in the step 4. Then a step 7 sets, at the data transfer from the image sensor arrays after the charge accumulation in the step 6, a gain appropriate for the block of the transferred data in the variable-gain amplifier.

Figure 11:
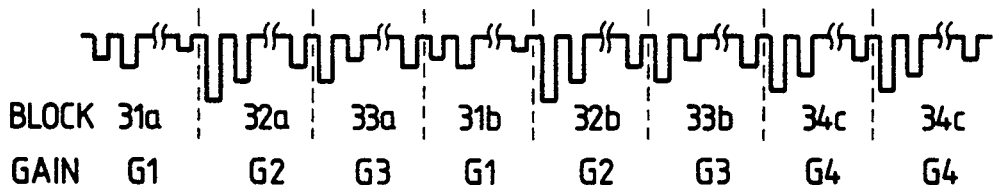
FIG. 11 is a chart showing the gain change of a variable-gain amplifier in the second embodiment shown in FIG. 10.

The gain switching in said step 7 is conducted, as shown in FIG. 11, to select a gain G1 for the data of the first transferred block 31a, then a gain G2 for the block 32a, G3 for the block 33a and G4 for the block 34c. Also selected are a gain G1 for the block 31b, G2 for the block 32b, G3 for the block 33b and G4 for the block 34b.

Then a step 8 stores the data transferred to the microprocessor 6 into the memories corresponding to the blocks, while detecting the peak value in each block. A succeeding step 9 discriminates whether the input of all the data is completed, and, if not completed, the sequence returns to the step 7 to repeat the setting of the gain for the next block and the data storage in the memory. When the input of data of all the blocks is completed, the sequence proceeds to a step 10.

The step 10 executes the calculation for focus state detection on four sets of paired data stored in the memories, thus providing four results at maximum. Then a step 11 selects a result representing, for example, the shortest distance, and a step 12 drives the objective lens 1 to the in-focus position by the motor 7, according to the thus selected result.

When a next step 13 identifies the in-focus state of the objective lens 1, the focus state detecting operation is terminated. On the other hand, if an out-of-focus state is identified, the sequence returns to the step 4 to repeat the charge accumulation, gain setting of the variable-gain amplifier, data storage in the memories and focus state detection.

The step 13 identifies that the objective lens is in the in-focus state for example if the amount of drive of the motor 7 in the step 12 does not exceed a predetermined value.

In case the sequence returns to the step 4, the accumulation time T for the next cycle is determined according to the following equation:

$$T = Tr + Ps/Pm \times Grm/G0 \quad (9)$$

In this state, the object to be focused is in a block selected in the step 11, and the focus state detection in the next cycle and thereafter should be conducted with the best precision for the object of said selected block. Therefore the peak value of the block selected in the step 11 is used as Pm, and the gain used in the preceding cycle in the selected block is used as Grm. Thus, in the next charge accumulation, data appropriate for the calculation of focus state detection can be obtained with a gain approximately equal to G0, so that the focus state detection can be conducted with satisfactory precision for the object present in the selected block.

Also in the calculation of the equation (9), there may be employed, as Pm, the peak value of a block for which:

(peak value detected in step 7)/(gain calculated in gain 5) is largest, namely a block containing the object of highest brightness, and, as Grm, the gain used in the selected block in the preceding cycle.

If the gain of the variable-gain amplifier of the second controller 5 cannot be varied continuously, the gain setting in the step 7 can be made at a value closest available to the gain calculated in the step 5.

Figure 10:
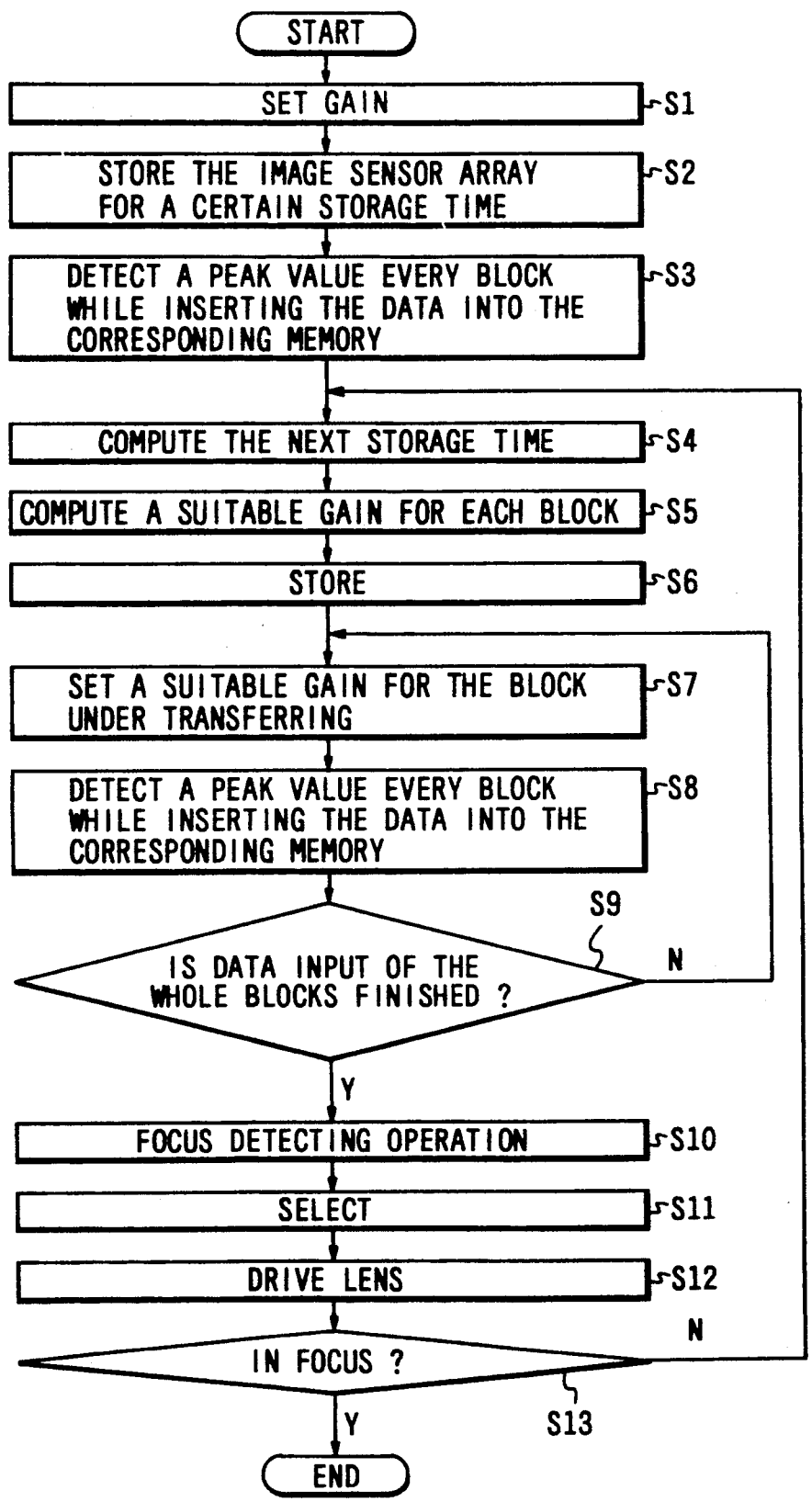
FIG. 10 is a flow chart of the control sequence in a second embodiment.

The second embodiment shown in FIG. 10 cannot be applied to a block division in which the adjacent blocks are mutually overlapping as shown in FIG. 7B, but should be applied to a non-overlapping block division as shown in FIG. 7A.

In the following there will be explained a third embodiment of the present invention, in which the coefficients for a filtering process conducted prior to the calculation of correlation on the output data from the image sensor arrays are varied according to the peak value of each block, thereby generating data appropriate for the calculation for focus state detection in all the blocks.

This is done, for example in the foregoing equation (3), by varying the denominator "12", or, in the equation (4), by multiplying the part other than the "offset" by a coefficient determined by the peak value.

Figure 12:
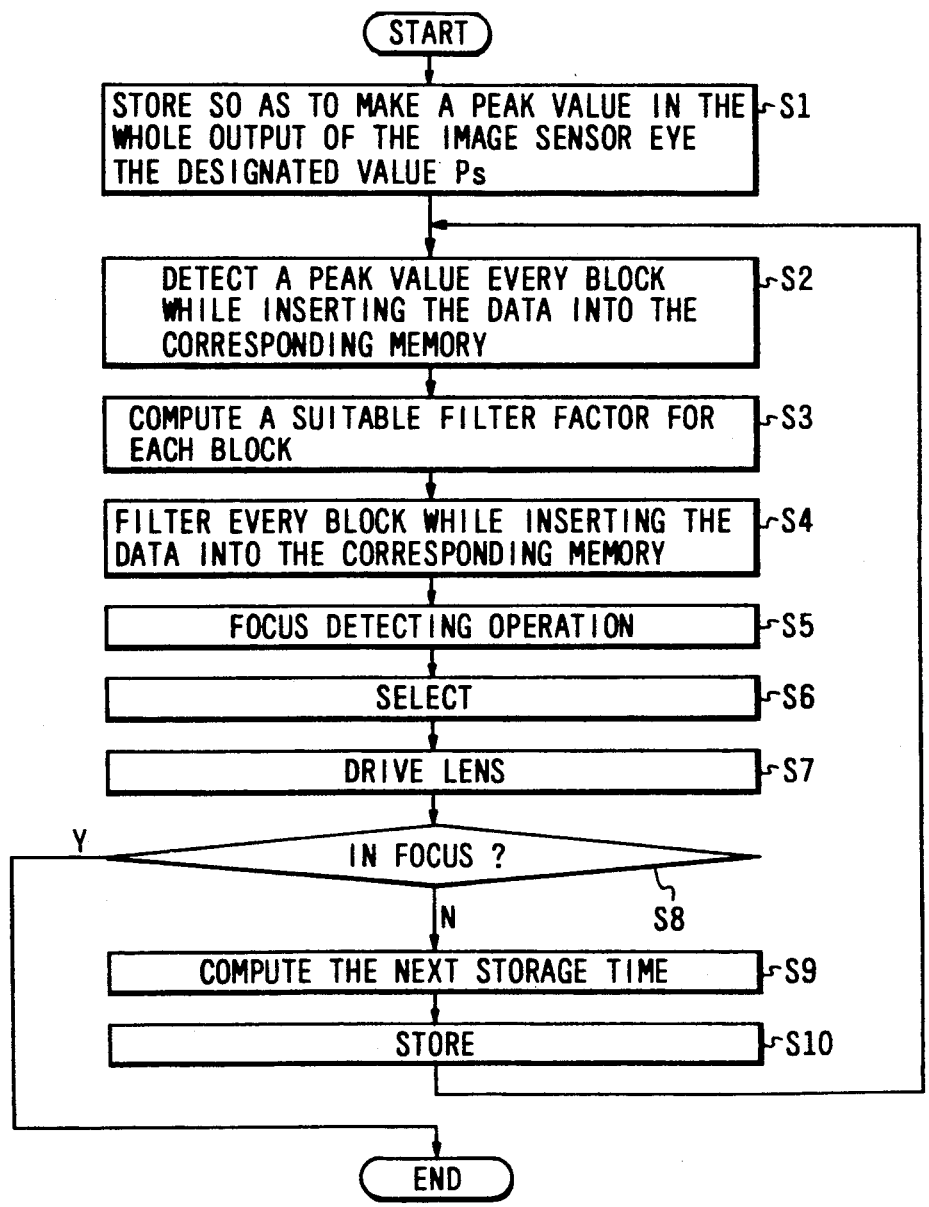
FIG. 12 is a flow chart of the control sequence in a third embodiment.

The function of said third embodiment will be explained in the following with reference to a flow chart shown in FIG. 12.

At first a step 1 executes charge accumulation in such a manner that the peak value in all the data is approximately equal to a predetermined value Ps, and a step 2 stores said data in the corresponding memories, while detecting the peak value in each block. The accumulation time in the above-explained operation is determined either from the output of a monitoring photosensor (not shown), or from the output of a past charge accumulation conducted at a suitable time.

Then a step 3 determines the coefficients of the filtering process, based on the peak values P1, P2, P3, P4 of the blocks detected in the step 2.

If the filtering is conducted only for the high-frequency component cut-off according to the equation (3), the appropriate coefficients H1, H2, H3, H4 respectively for the blocks 31, 32, 33, 34 are determined as follows:

$$H1 = P1 \times 12/Ps$$

$$H2 = P2 \times 12/Ps$$

$$H3 = P3 \times 12/Ps$$

$$H4 = P4 \times 12/Ps \tag{10}$$

Consequently the equations (3) can be transformed as follows:

$$a'(i) = \{2(2i-1) + 3 \times a(2i) + 4 \times a(2i+1) + 3 \times a(-2i+2) + a(2i+3)\}/Hx$$

$$b'(i) = \{b(2i-1) + 3 \times b)2i) + 4 \times b(2i+1) + 3 \times b-(2i+2) + b(2i+3)\}/Hx \tag{11}$$

wherein x = 1, 2, 3 or 4.

On the other hand, if the filtering is conducted only for the low frequency component cut-off according to the equations (4), the coefficients H1, H2, H3, H4 are given as follows:

$$H1 = Ps/P1,$$

$$H2 = ps/P2,$$

$$H3 = Ps/P3,$$

$$H4 = Ps/P4. \tag{12}$$

Thus the equations (4) can be transformed as follows:

$$a''(i) = \{-a(i) + 2 + a(i+h) - a(i+2h)\} \times Hx + \text{offset}$$

$$b''(i) = \{-b(i) + 2 \times b(i+h) - b(i+2H)\} \times Hx + \text{offset} \tag{13}$$

wherein h and offset are predetermined natural numbers, and x = 1, 2, 3 or 4.

If the filtering is conducted for the high frequency component cut-off and the low frequency component cut-off, the coefficients need to be changed only for either filtering. Also there is preferably determined an upper limit for the coefficient H, since an excessively high value thereof degrades the precision of focus state detection.

Then a step 4 executes the filtering with modified coefficients for each block, and stores thus filtered data into the corresponding memories, and a step 5 executes the calculation for focus state detection with the filtered data of each block.

The calculation of the step 5 provides four results at maximum, then a step 6 selects therefrom a result for example indicating the shortest distance, and a step 7 drives the objective lens 1 to the in-focus position by the motor 7 according to the thus selected result. Then, if a step 8 identifies the in-focus state of the lens 1, the focus state detecting operation is terminated. On the other hand, if an out-of-focus state is detected, the sequence proceeds to a step 9.

The step 9 calculates the accumulation time T of the next cycle as follows:

$$T = Tr \times Ps/Pm \tag{14}$$

wherein Tr is the accumulation time in the preceding cycle, and Pm is the peak value of the block selected in the step 6. If the peak value of the already selected block is used as Pm as explained above, the peak value obtained in the next accumulation in the block which was selected in the preceding cycle and which is to be focused can be made approximately equal to the predetermined value Ps appropriate for the calculation for focus state detection. Also the filtering coefficient H is not increased, so that the focus state detection can be executed with satisfactory precision.

Also as Pm of the equations (14), there may be employed the largest one of the peak values P1, P2, P3, P4 detected in the step 2.

A next step 10 executes the charge accumulation of the image sensor arrays with the accumulation time T calculated in the step 9, and the sequence then returns to the step 2 for repeating the above-explained procedure.

In this third embodiment, the gain of the variable-gain amplifier of the second controller 5 can be maintained constant in the ordinary charge accumulation or data transfer, but is controlled under severe photographing conditions. For example there is selected a high or low gain respectively when the entire object field is very dark or very bright.

In the following there is explained the reason of correction, in the third embodiment, not on individual data but in the filtering process.

The A/D converter in the microprocessor 6 generally has a resolving power of 8 or 10 bits, and 1 byte (8 bits) of the memory is usually assigned to a unit of data of the image sensor arrays, since the memory capacity in the microprocessor 6 is limited. Thus the 8-bit data of the image sensor arrays can assume integral values from 0 to 255.

Consequently a fractional number, eventually resulting from a division or a multiplication with a number involving a fractional part, is discarded and only the integral part remains in the memory.

For this reason, if a coefficient multiplication is applied to each of the data of the image sensor arrays, there is generated an error at this stage, so that the resulting data are distorted from the object image formed on the image sensor arrays.

If the filtering for high frequency component cut-off according to the equations (3) is applied to the data involving such error, an additional error is generated in the dividing operation, so that the precision of focus state detection is considerably affected by doubled errors.

However, in the third embodiment explained above, since the coefficients in the filtering are varied according to the peak value of each block, the error is generated only once even after the filtering for the high frequency component cut-off. Also with respect to the filtering for the low frequency component cut-off, the additions and subtractions followed by multiplication as in the third embodiment are more advantageous than the additions and subtractions of plural data already involving errors by multiplication.

Figure 13:
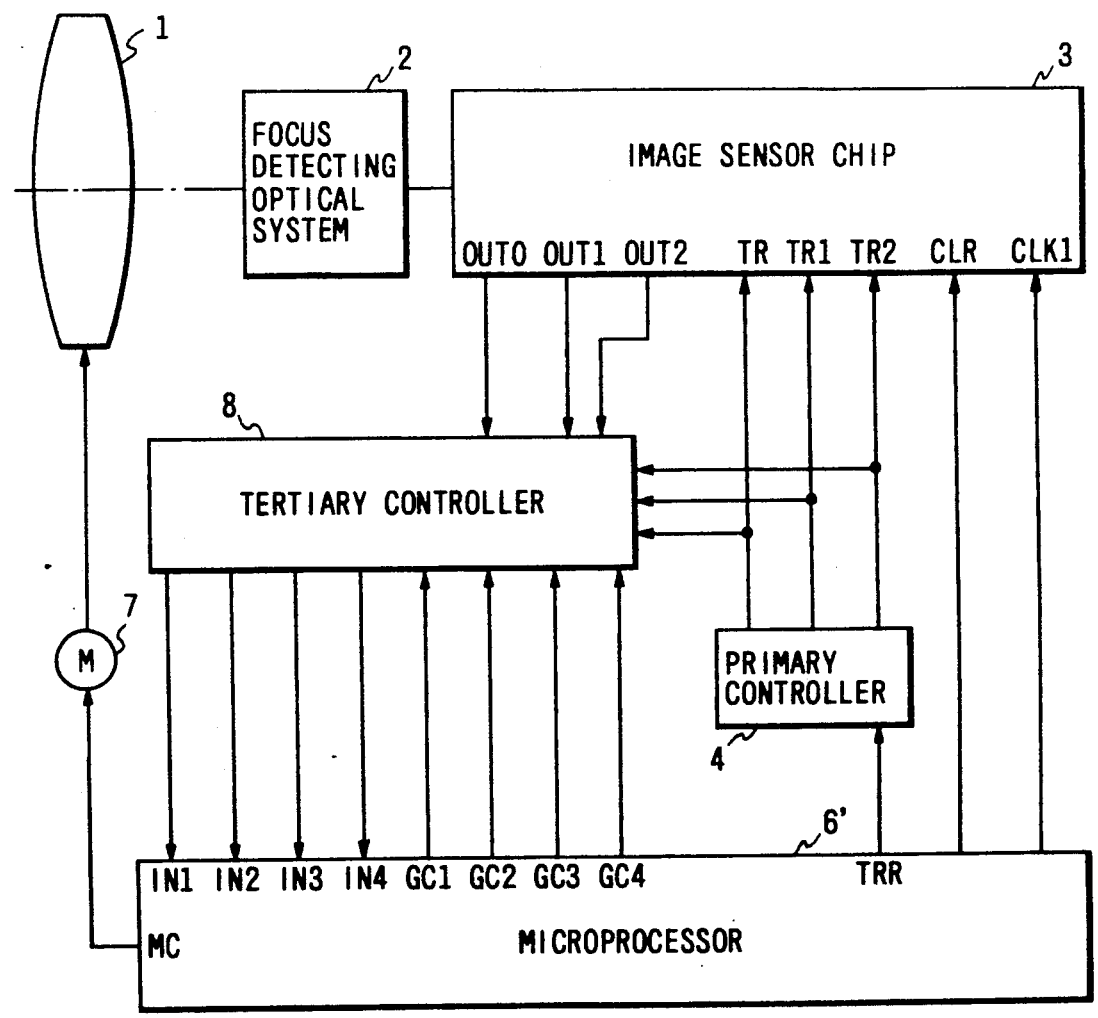
FIG. 13 is a block diagram of a fourth embodiment of the present invention.

In the following there will be explained a fourth embodiment of the present invention shown in FIG. 13, which is somewhat different from the foregoing three embodiments shown in FIG. 3. In FIG. 13 the same components as those in FIG. 3 are represented by the same numbers and will not be explained further. The structure shown in FIG. 13 is different from that in FIG. 3, in that the microprocessor 6' in FIG. 13 is provided with plural ports GC and IN, and that the second controller 5 with a variable-gain amplifier 5 is replaced by a third controller 8 with plural variable-gain amplifiers.

Figure 14:
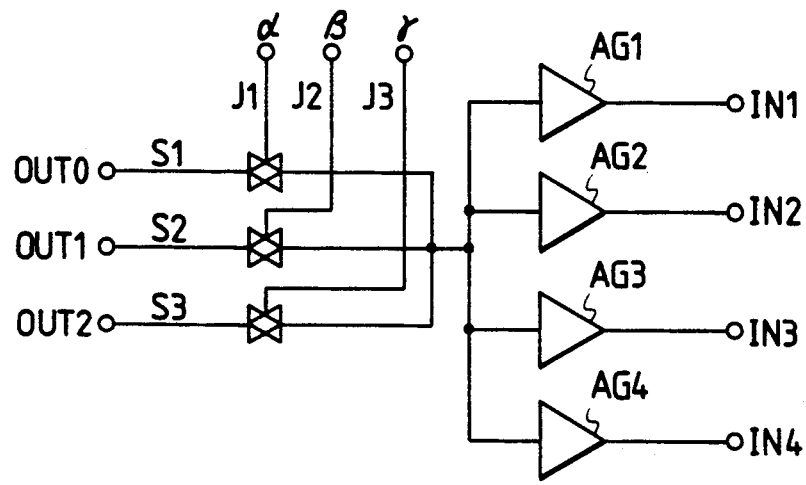
FIG. 14 is a circuit diagram of a controller of the fourth embodiment.

At first the third controller 8 will be explained with reference to FIG. 14, corresponding to FIG. 6B showing the second controller 5. The part shown in FIG. 6A is the same, and is not, therefore, shown again.

The third controller 8 serves to unite three outputs OUT0, OUT1, OUT2 of the image sensor array chip 3 and sends the united output in parallel to four variable-gain amplifiers AG1, AG2, AG3, AG4 for supply to input ports IN1-IN4 of the microprocessor 6'. The output terminals OUT0, OUT1, OUT2 of the image sensor array chip 3 are connected to switches S1, S2, S3 controlled by signals supplied to terminals J1, J2, J3. The output terminals of said switches are united and connected, in parallel, to variable-gain amplifiers AG-1-AG4, of which gains are respectively controlled by plural digital signals or an analog signal supplied from ports GC1-GC4 of the microprocessor 6'. The data amplified in said amplifiers AG1-AG4 with respectively different gains are supplied to the microprocessor 6' through the input ports IN1-IN4. Consequently, the output of each pixel in the image sensor arrays is supplied to the microprocessor 6' simultaneously with four different gains.

Different from the aforementioned microprocessor 6, the microprocessor 6' has functions of setting the gains for four variable-gain amplifiers and receiving the data from four input ports. The gains of the four variable-gain amplifiers AG1-AG4 are respectively so selected that the data from the blocks 31-34 become appropriate for the calculation of focus state detection. Among the four sets of data of different gains simultaneously entered to the input ports IN1-IN4, there are selected the data from an input port corresponding to the desired block, and stored in the memory. The data of the block 31a or 31b are taken from the input port IN1. Likewise the data of the block 32a or 32b; 33a or 33b; or 34c or IN3 or IN4. If the blocks are formed in mutually overlapping manner as shown in FIG. 7B, the data of the overlapping area are taken from two input ports corresponding to the blocks to which said area belongs, and are used for focus state detection in respective blocks. The focus state detection provides four results is selected at maximum, then a result representing for example the shortest distance as explained before, and the objective lens 1 is driven by the motor 7 according to the thus selected result.

Figure 15:
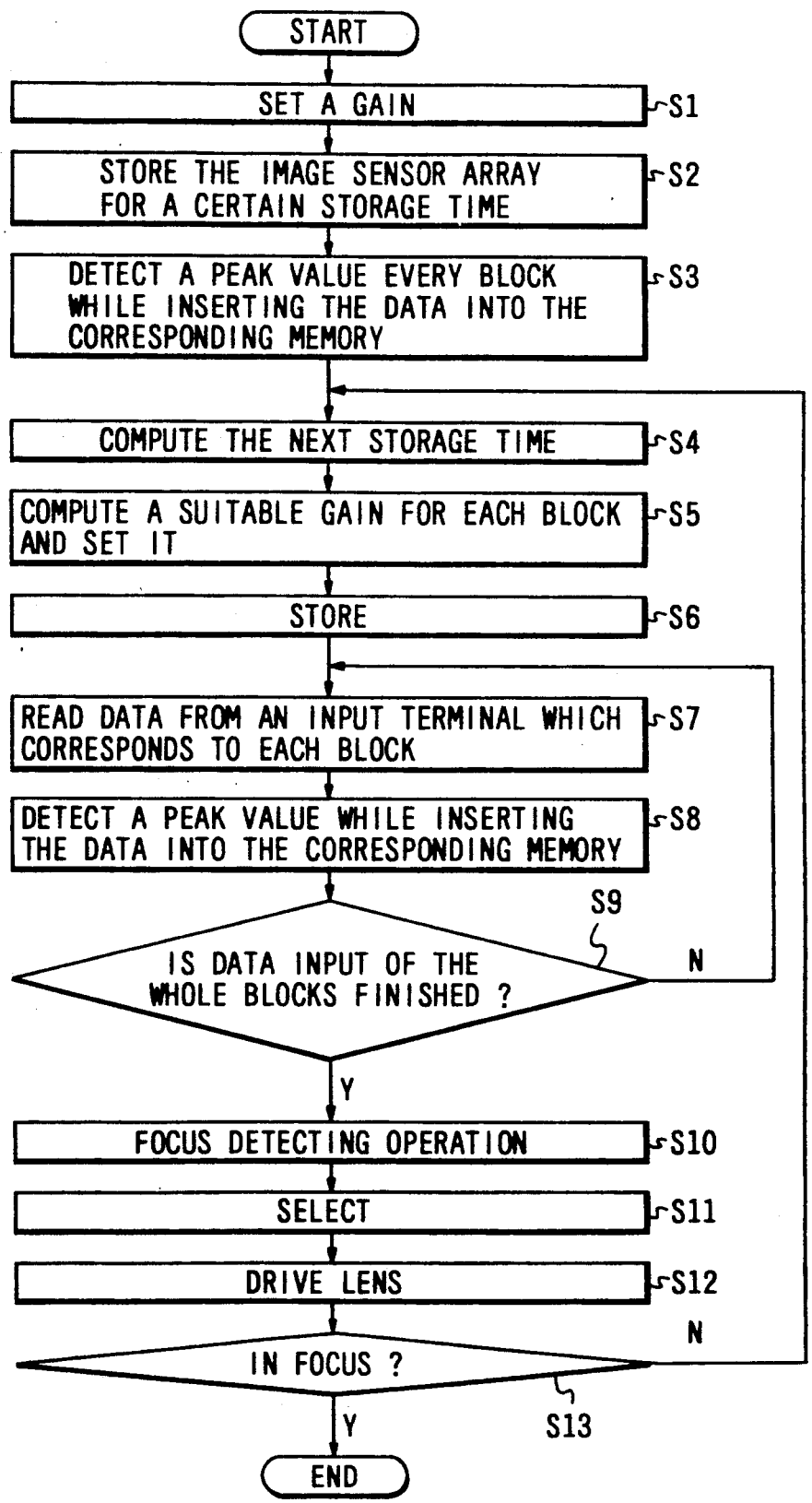
FIG. 15 is a flow chart of the control sequence of the fourth embodiment.

Now the function of the fourth embodiment will be explained with reference to FIG. 15. In said embodiment appropriate gains are applied on the outputs of the blocks to obtain data appropriate for focus state detection in all the blocks.

At first predetermined signals are sent from the ports GC1-GC4 to the third controller 8 for setting the gains of the variable-gain amplifiers at a basic value G0 (step 1). Said value G0 is preferably set at the lowest possible gain for said amplifiers, because an excessively high gain will reduce the S/N ratio of the output signals of the image sensor arrays. Then the charge accumulation is conducted in the image sensor arrays (step 2), and the obtained data are stored in the memories corresponding to the blocks, with detection of the peak value in each block (step 3). Said charge accumulation is conducted for evaluating the contrast of the image of the object projected on the image sensor arrays, so that the accumulation time therefor is so selected as not to cause saturation in said A/D conversion and not to obtain an excessively low output, and can be determined, for example, by the output of an unrepresented monitoring photosensor. Then, a step 4 determines the accumulation time T of the next cycle according to the following equation:

$$T = Tr \times Ps/Pm \quad (15)$$

wherein Pm is the largest of the peak values P1, P2, P3, P4 detected in the step 2, and Tr is the accumulation time in the preceding cycle. The charge accumulation conducted in the image sensor arrays with the thus calculated accumulation time provides a peak value approximately equal to the predetermined value Ps, among all the outputs of the arrays.

A step 5 determines the gain to be applied to the output of each block, from the peak value in said block, the accumulation time Tr in the preceding cycle and the accumulation time T in the next cycle calculated in the step 4, in such a manner that the peak value of said block becomes equal to the predetermined value Ps. The gains G1, G2, G3, G4 of the variable-gain amplifiers AG1, AG2, AG3, AG4 appropriate for the blocks 31, 32, 33, 34 are determined from the gains Gr1, Gr2, Gr3, Gr4 in the preceding cycle, according to the following equations:

$$G1 = Gr1 \times Ps/P1 \times Tr/T,$$

$$G2 = Gr2 \times Ps/P2 \times Tr/T,$$

$$G3 = Gr3 \times Ps/P3 \times Tr/T,$$

$$G4 = Gr4 \times Ps/P4 \times Tr/T. \quad (16)$$

As the preceding gain is G0 selected in the step 1, there is obtained:

$$Gr1 = Gr2 = Gr3 = Gr4 = G0.$$

These values are released from the ports GC1-GC4 to set the gains of the variable-gain amplifiers AG1-AG4 of the third controller 8. Then the charge accumulation is conducted in the image sensor arrays with the accumulation time calculated in the step 4 (step 6). At the data transfer from the image sensor arrays after said charge accumulation, the data are received from an input port corresponding to the block of the transferred data (step 7). Thus the data are received from the input port IN1 for the data of the first transferred block 31a; then IN2 for the block 32a; IN3 for the block 33a; and IN4 for the block 34c. Similarly there are used the input port IN1 for the block 31b; IN2 for the block 32b; IN3 for the block 33b; and IN4 for the block 34d. The data thus transferred to the microprocessor 6' are stored in the memory corresponding to each block, with the detection of the peak value in each block (step 8). Then a step 9 discriminates whether the input of all the data is completed, and, if not, the sequence returns to the step 7 for repeating the data input and storage in the memory. If said input is completed, a step 10 executes the calculation for focus state detection, on each of four sets of paired blocks. Said calculation provides four results at maximum, and there is selected a result representing, for example, the shortest distance (step 11). The motor 7 is driven according to the thus selected result, thereby moving the objective lens 1 (step 12). If the in-focus state is identified in a step 13, the focus state detecting operation is terminated, but, if not, the sequence returns to the step 4 for repeating the charge accumulation, gain setting of the variable-gain amplifiers, data storage in the memory and focus state detection as explained above. The objective lens is identified as in the infocus state if the amount of drive of the motor 7 in the step 12 does not exceed a predetermined amount. In case the sequence returns to the step 4, the accumulation time of the next cycle is determined according to the next equation:

$$T = Tr \times Ps/Pm \times Grm/G0 \qquad (17)$$

In this state it is already identified from the charge accumulation and calculation in the preceding cycle that the object to be focused is present in a block which has provided the result selected in the step 11, and the focus state detection in the next and ensuing cycles should be made with the best precision for the thus selected object. Thus the peak value of the block which has provided the result selected in the step 11 is used as Pm, and the gain used in said block in the preceding cycle is used as Grm, whereby said block will provide, in the next charge accumulation, data appropriate for the calculation for focus state detection with a gain approximately equal to G0 and the focus state detection with satisfactory precision can be conducted for the object present in said block. It is also possible to employ, as Pm, the peak value of a block in which: (peak value detected in step 8)/(gain calculated in step 5) is largest, namely a block containing an object of highest brightness, and, as Grm, the gain used for said block in the preceding cycle. If the gain of the variable-gain amplifiers of the third controller 8 cannot be varied in continuous manner, the gain setting in the step 5 may be conducted at a closest available value to the calculated value.

In the foregoing description, the microprocessor is provided with variable-gain amplifiers and input ports of a number equal to the number of blocks, but such number is not limiting. For example there can be obtained sufficient effect with two variable-gain amplifiers and two input ports. In such case the gains of two variable-gain amplifiers are so selected that appropriate data can be obtained from a block with highest peak value and a block with lowest peak value. For said two blocks there are selected the data of an input port corresponding to a variable-gain amplifier with a gain appropriate for each of said blocks. For other blocks, there are selected the data of an input port corresponding to a variable-gain amplifier of which the gain is closer to the appropriate level.

Figure 16:
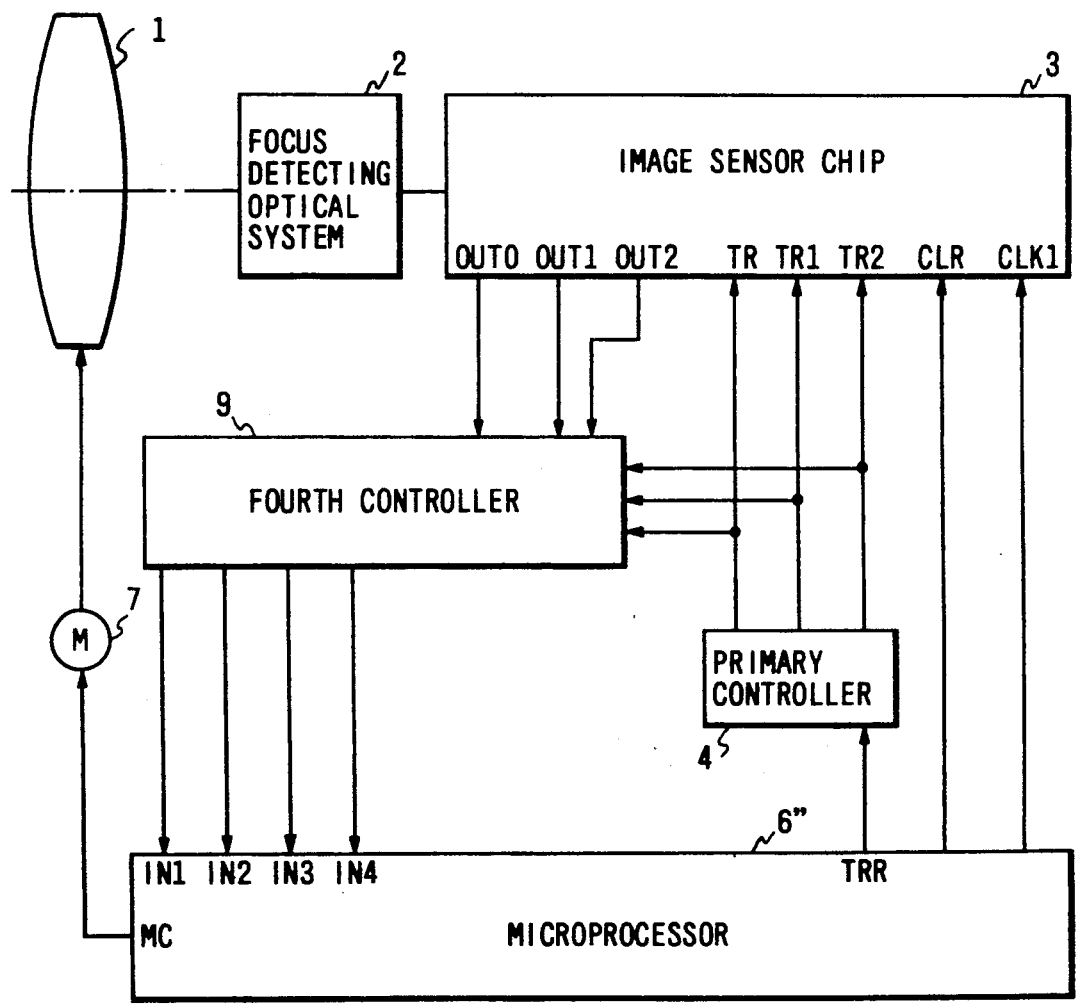
FIG. 16 is a block diagram of a fifth embodiment of the present invention.

In the following there will be explained a fifth embodiment of the present invention with reference to FIG. 16, in which the same components as those in FIG. 13 are represented by the same numbers and will not be explained further. The difference between FIGS. 16 and 13 lies in a fact that a microprocessor 6" in FIG. 16 is not provided with the ports GC, and that the third controller 8 with plural variable-gain amplifiers is replaced by a fourth controller 9 with plural fixed-gain amplifiers.

Figure 17:
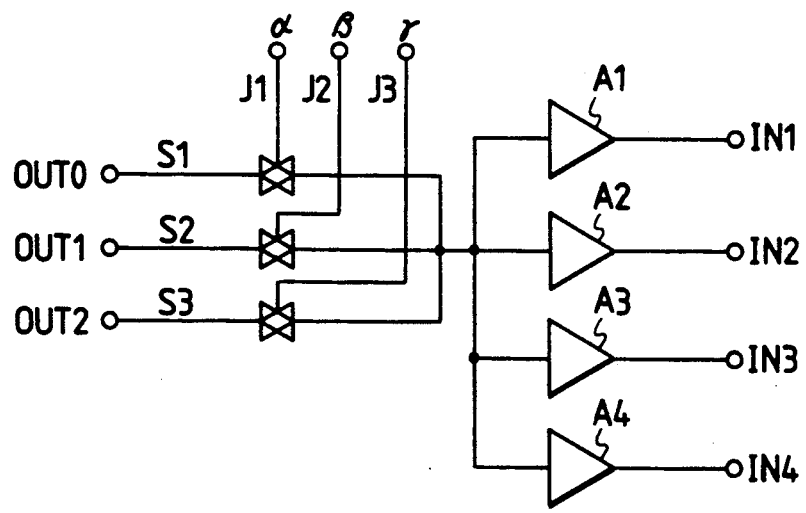
FIG. 17 is a circuit diagram of a controller of the fifth embodiment.

At first the fourth controller 9 will be explained with reference to FIG. 17 which corresponds to FIG. 6B in the second controller 5. A part shown in FIG. 6A is the same and will not, therefore, be explained further.

The fourth controller 9 serves to unite the signal released from three output terminals OUT0, OUT1, OUT2 of the image sensor array chip 3, and to send the united signal, in parallel manner, to four amplifiers A1, A2, A3, A4 for signal supply to the input ports IN1-IN4 of the microprocessor 6". The output terminals OUT0, OUT1, OUT2 of the image sensor array chip 3 are respectively connected to switches S1, S2, S3 shown in FIG. 17, which are controlled by signals supplied to terminals J1, J2, J3. The output terminals of said switches are united, and are connected to the amplifiers A1-A4. With respect to the gain ka of the amplifier A1, the amplifiers A2-A4 respectively have gains equal to 2 ka, 4 ka, 8 ka. The data amplified in said amplifiers A1-A4 with respectively different gains are supplied to the microprocessor 6" through input ports IN1-IN4. Consequently a pixel in the image sensor array is supplied simultaneously to the microprocessor 6" with four different gains.

The microprocessor 6" controls the charge accumulation in such a manner that the peak value among all the output data of the image sensor arrays assumes a predetermined value when amplified in the amplifier A1 of the lowest gain. At the data transfer, among four sets of data of different gains supplied simultaneously to the input ports IN1-IN4, there is selected the output of an amplifier of a gain that has brought the peak value of a block closest to the predetermined value. In case the blocks are mutually overlapping as shown in FIG. 7B, the data of the overlapping area can be entered through two input ports corresponding to the appropriate two blocks and are used in the focus state detection in respective blocks. The calculation of focus state detection provides four results at maximum, then there is selected a result representing, for example, the shortest distance, and the motor 7 is driven according to the selected result to drive the objective lens 1.

In the following there will be explained the function of the fifth embodiment, with reference to FIG. 18. Said fifth embodiment selects most appropriate data for each block, from the outputs of amplifiers of different gains, thereby obtaining the outputs appropriate for focus state detection in all the blocks.

At first the charge accumulation of the image sensor arrays is conducted (step 1), and the data are entered through the port IN1 receiving the output of the amplifier A1 of lowest gain and are stored in the memories corresponding to the blocks, with detection of the peak value in each block (step 2). Said charge accumulation is conducted to evaluate the contrast of the object image projected on the image sensor arrays, so that the accumulation time is so selected as not to cause saturation in the A/D conversion and not to obtain an excessively low output, and is determined for example by the output of a monitoring photosensor (not shown). Then a step 3 calculates the accumulation time T of the next cycle according to the equation:

$$T = Tr \times Ps/Pm \qquad (18)$$

wherein Pm is the largest of the peak values P1, P2, P3, P4 detected in the step 2, and Tr is the accumulation time in the preceding cycle. The charge accumulation of the image sensor arrays with the thus calculated accumulation time T will provide a peak value approximately equal to Ps among all the outputs of said arrays.

A step 4 calculates an ideal gain of the amplifier for obtaining a predetermined peak value Ps in each block, from the peak value in said block, the accumulation time Tr in the preceding cycle, the gain in the preceding cycle and the accumulation time T of the next cycle calculated in the step 4. The gains G1, G2, G3, G4 for the blocks 31, 32, 33, 34 can be determined from the following equations, based on the gains Gr1, Gr2, Gr3, Gr4 selected in respective blocks in the preceding cycle:

$$G1 = Gr1 \times Ps/P1 \times Tr/T$$

$$G2 = Gr2 \times Ps/P2 \times Tr/T$$

$$G3 = Gr3 \times Ps/P3 \times Tr/T$$

$$G4 = Gr4 \times Ps/P4 \times Tr/T.$$

In this state, since lowest gain ka was selected in the preceding cycle:

$$Gr1 = Gr2 = Gr3 = Gr4 = ka.$$

Then the charge accumulation of the image sensor arrays is conducted with the accumulation time calculated in the step 3 (step 5). At the data transfer after said charge accumulation, the data are entered from an input port receiving the output of an amplifier with a gain appropriate for each block of data (step 6). Stated differently, there is selected an input port receiving the output of an amplifier of a gain closest to the ideal gain calculated in the step 4. The data thus transferred to the microprocessor 6'' are stored in the memories corresponding to the blocks, with the detection of the peak value in each block (step 7). A step 8 discriminates whether the input of all the data has been completed, and, if not, the sequence returns to the step 6 for repeating the data input and storage in the memories. If said input has been completed, the sequence proceeds to a step 9 for effecting the calculation for focus state detection on four sets of paired blocks. Said calculation provides four results at maximum, and a result is selected representing for example the shortest distance (step 10). Then the motor 7 is driven according to the thus selected result, thereby moving the objective lens 1 (step 11). If the objective lens 1 has reached the in-focus position, the focus detecting operation is terminated, but, if not, the sequence returns to the step 3 (step 12), thus repeating the charge accumulation, calculation of ideal amplifier gains, data storage into the memories and focus state detection in the same manner as explained above. The objective lens is identified to have reached the in-focus position, if the amount of drive of the motor 7 in the step 11 does not exceed a predetermined value. When the sequence returns to the step 3, the accumulation time T for the next cycle is calculated according to the following equation:

$$T = Tr \times Ps/Pm \times Grm/ka \quad (20)$$

In this state it is already identified from the charge accumulation and the calculation of the preceding cycle that the object to be focused is present in a block which has provided the result selected in the step 10, and the focus state detection in the next cycle and thereafter should be conducted with best precision for thus selected object. Thus, in the next charge accumulation, by employing the peak value of the block providing the result selected in the step 10 as Pm and the gain applied in said block in the preceding cycle as Grm, said block provides data appropriate for focus state detection with a gain ka, so that the focus state detection can be conducted with satisfactory precision for an object present in said block. It is also possible to employ, as Pm, the peak value of a block in which: (peak value detected in step 7)/(gain selected in step 6) becomes largest, or a block containing the object of highest brightness, and, as Grm, the gain applied in said block in the preceding cycle.

In contrast to the fourth embodiment utilizing variable-gain amplifiers, the fifth embodiment utilizing fixed-gain amplifiers is not necessarily capable of providing appropriate data in all the blocks, but has the advantage of lighter load on the microprocessor, because of the absence of the ports for gain setting.

As explained in the foregoing, the present invention allows focusing the objective lens securely to the desired object with a high precision, since data appropriate for focus state detection can be obtained in each block of the distance measuring zone even when the plural objects of different brightnesses are present in said zone.

What is claimed is:

1. A focus detecting device comprising:
   light receiving means including a pair of arrays of photoelectric converting elements of charge accumulation type for respectively receiving light beams coming from different exit pupils of an objective lens, and generating an output signal in each of plural blocks formed in a distance measuring zone defined in an object field;
   level discriminating means for discriminating the level of the output signal of each block from said light receiving means, and detecting a block or blocks in which the level of the output signal is outside a predetermined level range;
   means for regulating said signal level in such a manner that the output signal of the block or blocks detected by said level discriminating means is brought into said predetermined level range;
   means for generating focus information for each block according to the output signal in said predetermined level range; and
   means for selecting optimum focus information from the focus information of said plural blocks.

2. A focus detecting device according to claim 1, wherein said signal level regulating means comprises means for determining the charge accumulation time for bringing the output signal of the block or blocks detected by said level discriminating means into said predetermined level range, and said light receiving means is adapted to generate the output signal again with thus determined charge accumulation time.

3. A focus detecting device according to claim 2, wherein said charge accumulation time determining means is adapted to determine the charge accumulation time for a succeeding focus detecting cycle, based on the output signal of a block for which selected optimum focus information is generated.

4. A focus detecting device according to claim 1, wherein said signal level regulating means comprises:
   a variable-gain amplifier for amplifying the output signal from said arrays of photoelectric converting elements; and means for controlling the gain of said amplifier by determining the amplifying gain for bringing the output signal of a block or blocks detected by said level discriminating means into said predetermined level range.

5. A focus detecting device according to claim 4, wherein said gain control means is adapted to determine the gain of said amplifier for a succeeding focus detecting cycle, based on the output signal of a block for which the selected optimum focus information is generated.

6. A focus detecting device according to claim 1, further comprising filter means with predetermined filtering coefficients for applying a filtering process to the output signal of said light receiving means, wherein said signal level regulating means comprises means for determining said filter coefficients required for bringing the output signal of the block or blocks detected by said level discriminating means into said predetermined level range.

7. A focus detecting device according to claim 6, wherein said filtering coefficient determining means is adapted to determine said filter coefficients for a succeeding focus detecting cycle, based on the output signal of a block for which the selected optimum focus information is generated.

8. A focus detecting device according to claim 1, wherein said signal level regulating means comprises:
plural variable-gain amplifiers for amplifying the output from said arrays of photoelectric converting elements;
means for determining the gains of said amplifiers in response to said level discriminating means; and
means for selecting an amplifier with an optimum gain for each block.

9. A focus detecting device according to claim 8, wherein the output signal from each block of said arrays of photoelectric converting elements is supplied simultaneously in parallel manner to said amplifiers, thereby generating amplified outputs corresponding to the gains of said amplifiers.

10. A focus detecting device according to claim 1, wherein said signal level regulating means comprises:
plural amplifiers of respectively different gain for amplifying the output signal from said arrays of photoelectric converting elements; and
means for selecting an amplifier with an optimum gain, in response to said level discriminating means.

11. A focus detecting device according to claim 10, wherein the output from each block of said arrays of photoelectric converting elements is simultaneously supplied in parallel manner to said amplifiers, thereby generating amplified outputs corresponding to the gains of said amplifiers.

12. A focus detecting device comprising:
light receiving means including arrays of photoelectric converting elements of charge accumulation type, and generating an output signal in each of plural blocks formed in a distance measuring zone defined in an object field;
level discriminating means for discriminating the level of the output signal of each block from said light receiving means, and detecting a block or blocks in which the level of the output signal is outside a predetermined level range;
means for regulating said signal level in such a manner that the output signal of the block or blocks detected by said level discriminating means is brought into said predetermined level range;
means for generating focus information for each block according to the output signal in said predetermined level range; and
means for selecting optimum focus information from the focus information of said plural blocks.

* * * * *